US 10,024,248 B2
Jul. 17, 2018

(12) United States Patent
Haizaki et al.

(54) ENGINE CONTROL DEVICE

(71) Applicant: MAZDA MOTOR CORPORATION, Hiroshima (JP)

(72) Inventors: Yukio Haizaki, Hiroshima (JP); Masayoshi Higashio, Hiroshima (JP); Kensuke Ashikaga, Hiroshima (JP); Akira Tsuda, Hofu (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/304,808

(22) PCT Filed: Apr. 20, 2015

(86) PCT No.: PCT/JP2015/062021
§ 371 (c)(1),
(2) Date: Oct. 17, 2016

(87) PCT Pub. No.: WO2015/163292
PCT Pub. Date: Oct. 29, 2015

(65) Prior Publication Data
US 2017/0045001 A1    Feb. 16, 2017

(30) Foreign Application Priority Data

Apr. 25, 2014 (JP) ................................ 2014-091062

(51) Int. Cl.
*F02D 13/06* (2006.01)
*F02D 13/02* (2006.01)
(Continued)

(52) U.S. Cl.
CPC ............ *F02D 13/06* (2013.01); *F02D 13/02* (2013.01); *F02D 13/04* (2013.01); *F02D 17/02* (2013.01);
(Continued)

(58) Field of Classification Search
CPC .......... F02D 13/02; F02D 13/06; F02D 17/02; F02D 31/001; F02D 41/0087; F02D 41/022; F02D 41/023; F02D 2041/0012
See application file for complete search history.

(56) References Cited

U.S. PATENT DOCUMENTS 6,192,857 B1 *   2/2001   Shimada ................... F01L 9/04
                                                                123/295
6,334,935 B1 *   1/2002   Uehara ................. C07F 7/1836
                                                                 203/21
(Continued)

FOREIGN PATENT DOCUMENTS

JP      S59-025053 A      2/1984
JP      S60-150413 A      8/1985
JP      2007-120404 A     5/2007

OTHER PUBLICATIONS

International Search Report issued in PCT/JP2015/062021; dated Jul. 14, 2015.

*Primary Examiner* — Erick Solis
*Assistant Examiner* — Anthony L Bacon
(74) *Attorney, Agent, or Firm* — Studebaker & Brackett PC

(57) ABSTRACT

Provided are a valve stop mechanism capable of switching intake valves and exhaust valves of deactivated cylinders between an openable/closable state and a closed state, and an engine speed control unit which controls the engine speed. The engine speed control unit controls the engine speed in such a manner that the amount of change in the engine speed with respect to time is reduced, as compared with a case in which a specific condition is not satisfied, when the specific condition that switching by the valve stop mechanism is not completed, and that connection between an engine and a power transmission unit is released is satisfied after issuance (Continued)

of a switching request from one of a reduced-cylinder operation and an all-cylinder operation to the other thereof.

16 Claims, 12 Drawing Sheets

(51) Int. Cl.
| | |
|---|---|
| *F02D 17/02* | (2006.01) |
| *F02D 41/00* | (2006.01) |
| *F02D 41/02* | (2006.01) |
| *F02D 31/00* | (2006.01) |
| *F02D 13/04* | (2006.01) |
| *F02D 41/30* | (2006.01) |

(52) U.S. Cl.
CPC ....... *F02D 31/001* (2013.01); *F02D 41/0002* (2013.01); *F02D 41/0087* (2013.01); *F02D 41/022* (2013.01); *F02D 41/3005* (2013.01); *F02D 2041/0012* (2013.01)

(56) References Cited

U.S. PATENT DOCUMENTS

| | | | |
|---|---|---|---|
| 9,273,623 B2* | 3/2016 | Attensperger | F02D 41/022 |
| 2002/0115526 A1* | 8/2002 | Wakashiro | B60K 6/485 |
| | | | 477/5 |
| 2005/0215396 A1* | 9/2005 | Shimada | B60W 10/02 |
| | | | 477/181 |
| 2007/0028690 A1* | 2/2007 | Hirowatari | F02D 11/105 |
| | | | 73/514.34 |
| 2015/0298700 A1* | 10/2015 | Kuroki | F02D 13/0211 |
| | | | 477/181 |

* cited by examiner

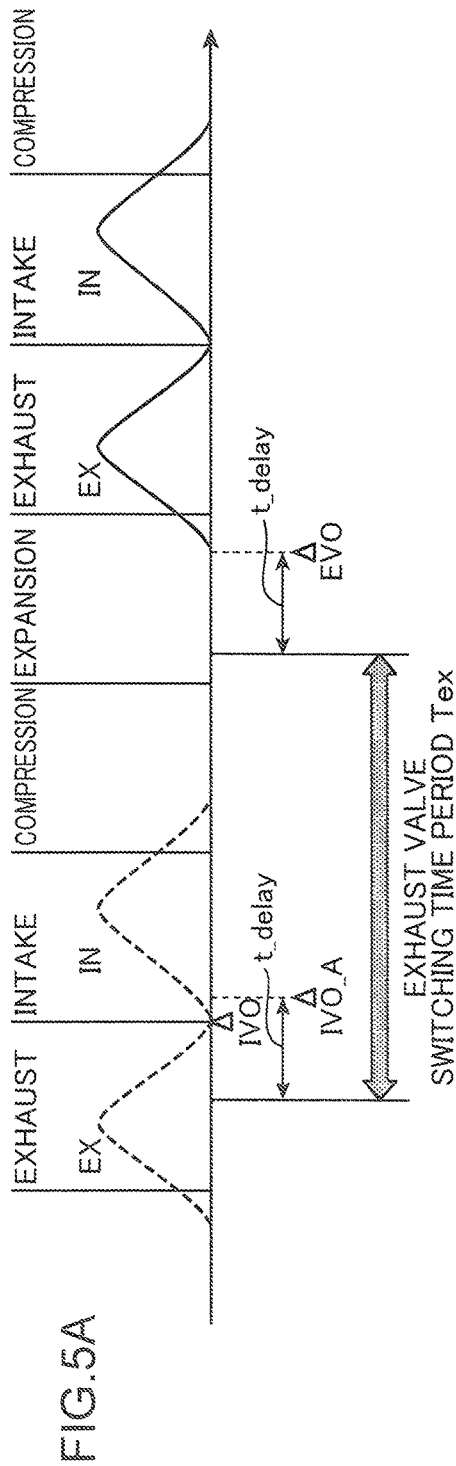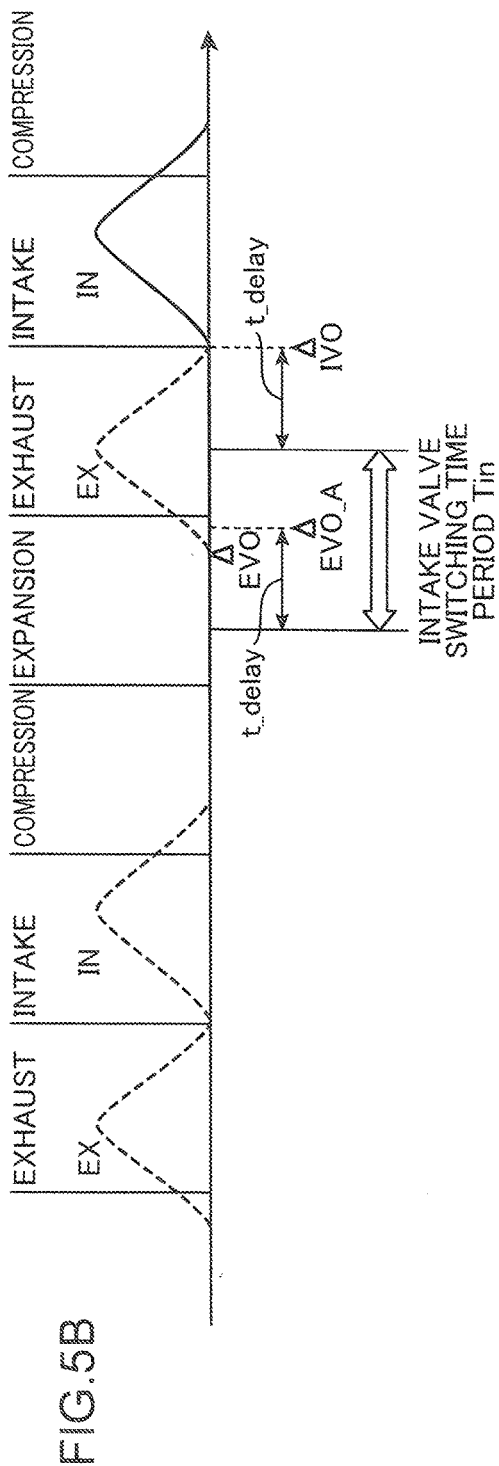

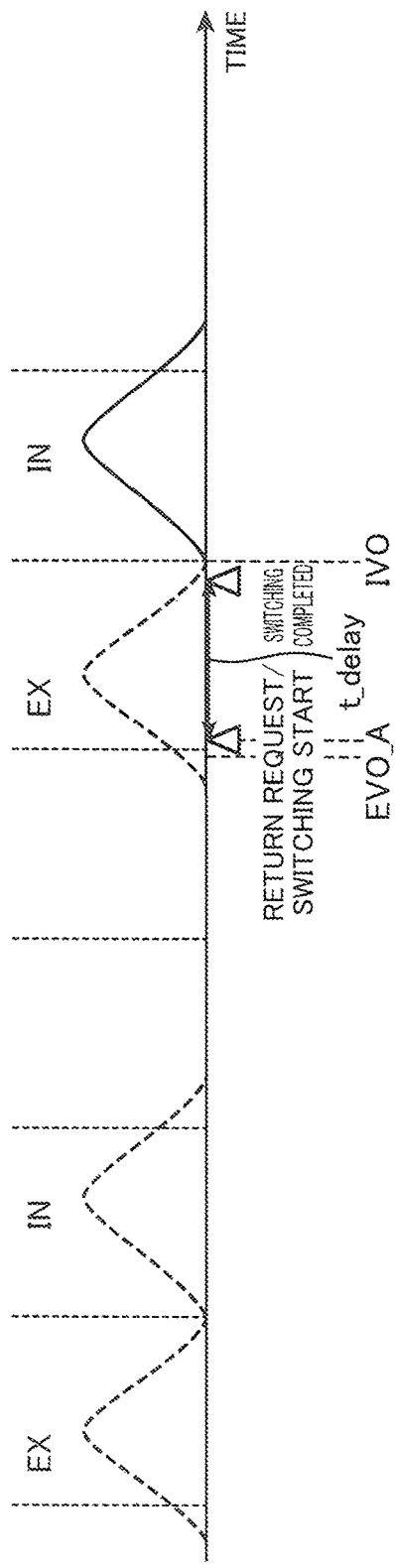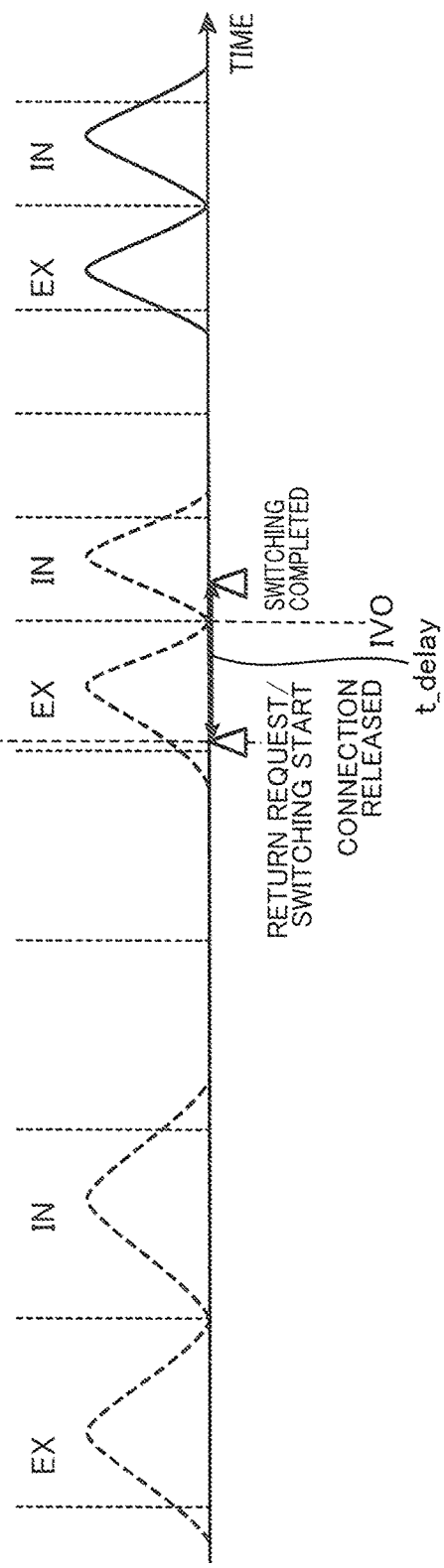

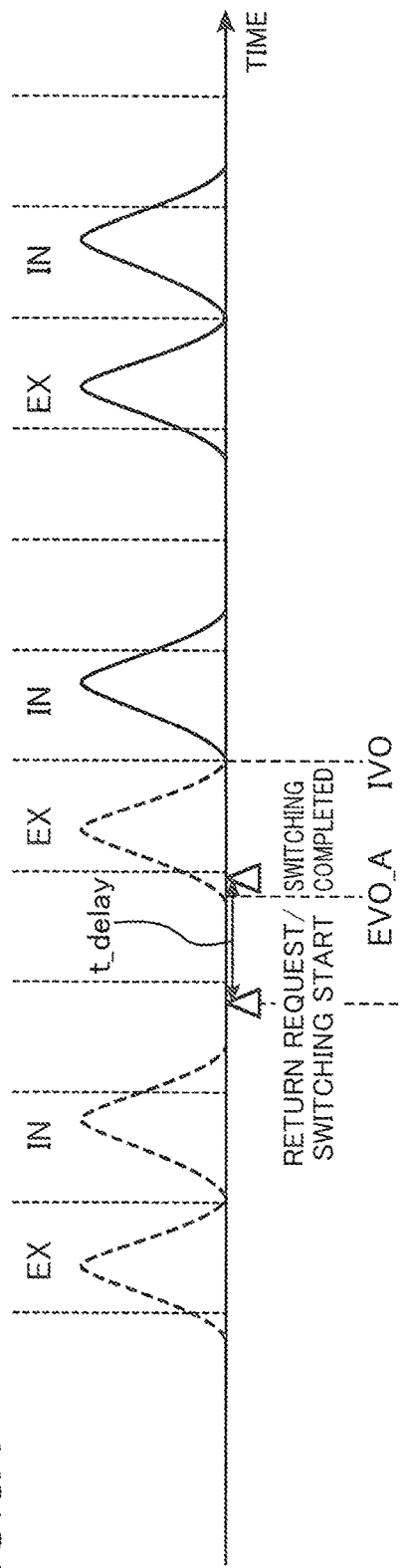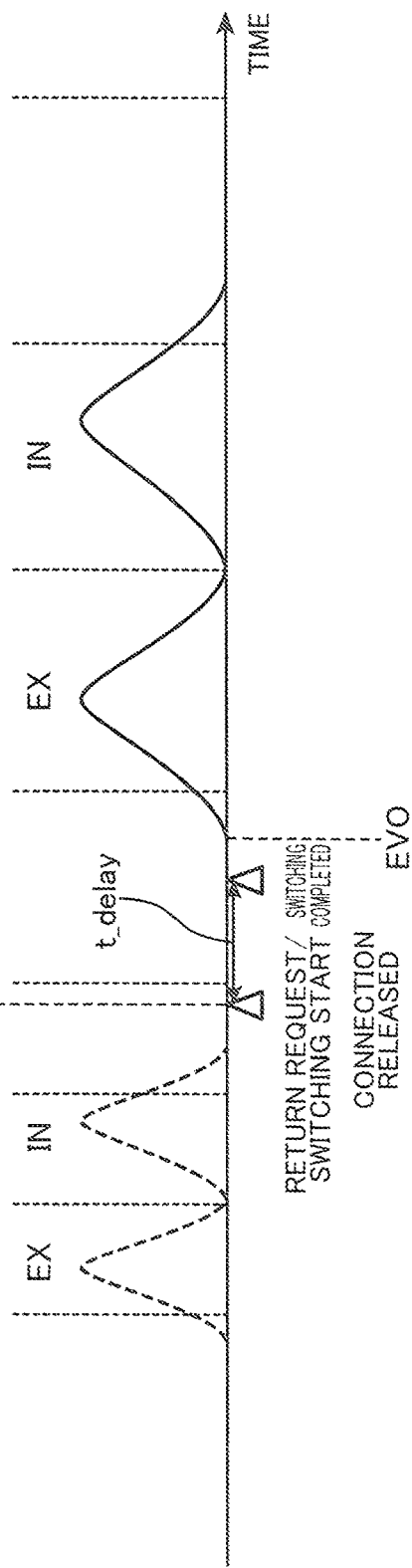

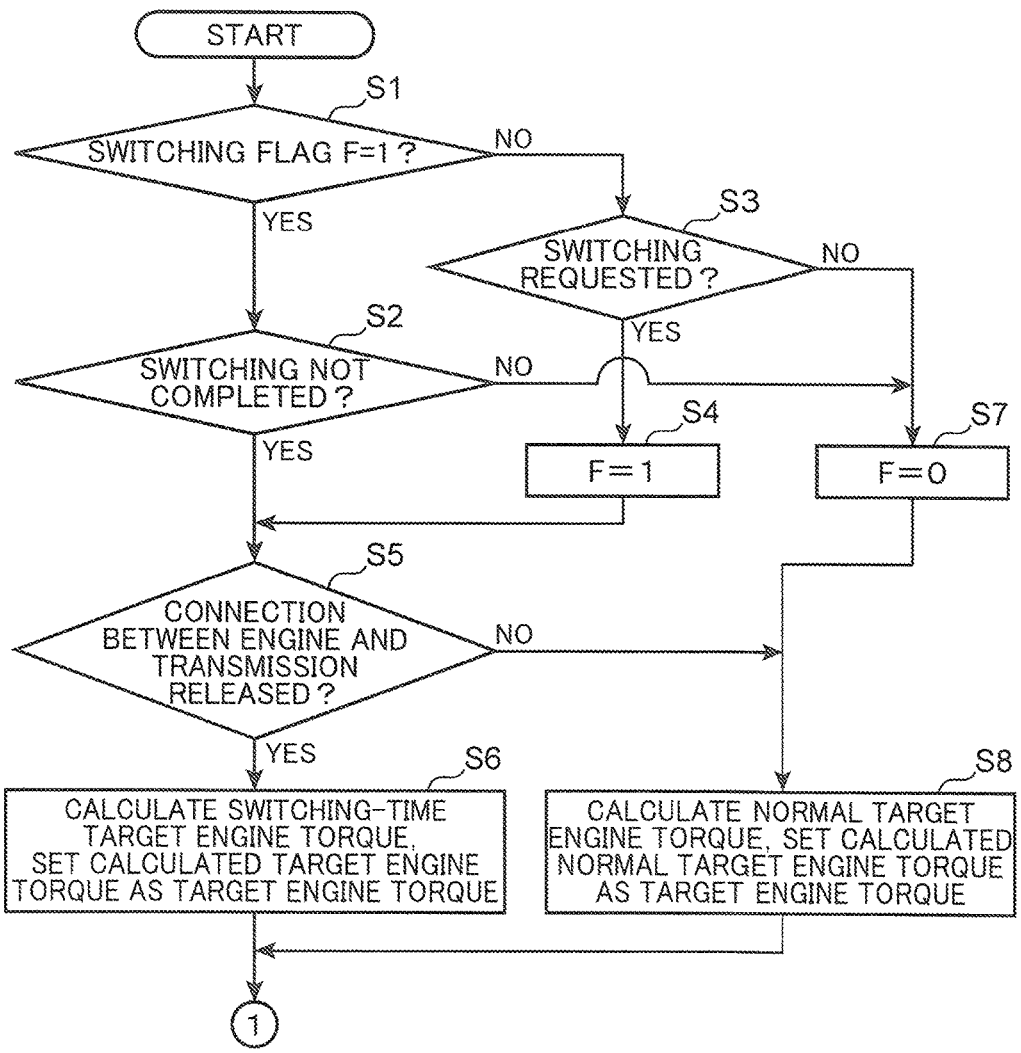

ENGINE CONTROL DEVICE

TECHNICAL FIELD

The present invention relates to a control device for an engine, which includes a plurality of cylinders provided with intake valves and exhaust valves, and which is configured to perform combustion of a fuel-air mixture.

BACKGROUND ART

Conventionally, as disclosed in Patent Literature 1, for the purpose of enhancing fuel efficiency or the like, an engine including a plurality of cylinders performs switching between a reduced-cylinder operation in which a part of the cylinders is deactivated by stopping opening and closing operations of the intake valves and the exhaust valves of the part of the cylinders, and by stopping combustion in the part of cylinders; and an all-cylinder operation in which opening and closing operations of the intake valves and the exhaust valves of all the cylinders are enabled, and combustion is performed in all the cylinders.

In an engine configured to perform switching between a reduced-cylinder operation and an all-cylinder operation, at the time of switching from one of the reduced-cylinder operation and the all-cylinder operation to the other thereof, a valve to be opened first, or a valve to be closed first is determined, out of the intake valves and the exhaust valves of a deactivated cylinder. For instance, there is a case, in which an intake valve of a deactivated cylinder is started to open first for the purpose of speedily activating the deactivated cylinder at the time of switching from a reduced-cylinder operation to an all-cylinder operation. Further, there is a case, in which an exhaust valve of a deactivated cylinder is started to open first for the purpose of confirming the opening and closing states of the exhaust valve of the deactivated cylinder. Further, there is a case, in which an exhaust valve of a deactivated cylinder is started to close first for the purpose of causing combustion gas to remain in the deactivated cylinder at the time of switching from an all-cylinder operation to a reduced-cylinder operation.

CITATION LIST

Patent Literature

Patent Literature 1: Japanese Unexamined Patent Publication No. 2007-120404

SUMMARY OF INVENTION

Technical Problem

When a valve to be opened first or a valve to be closed first is determined at the time of switching between a reduced-cylinder operation and an all-cylinder operation as described above, if connection between an engine, and a power transmission unit for transmitting power of the engine to wheels is released, and the engine speed drastically changes as a result of clutch disengagement or as a result of switching the transmission range to a neutral range at the time of issuance of a switching request or after issuance of a switching request, it may be impossible to open or close the intended valve first.

For instance, when a device for switching the opening and closing states of an intake valve and an exhaust valve of a deactivated cylinder between a state that the valve is kept closed, and an openable/closable state is of hydraulically driven type, the opening and closing states of the intake valve and the exhaust valve may be switched only upon lapse of a predetermined time period due to a hydraulic delay, even if the device is driven accompanied by the switching request. In this case, a timing at which switching the opening and closing states of an intake valve and an exhaust valve may not be associated with a valve start open timing of an intended valve, and it may be impossible to open or close the intended valve first, because the engine speed changes during a delay time period of a hydraulic operation.

Concerning the aforementioned phenomenon, Patent Literature 1 discloses a configuration, in which a gear position shifting operation of a transmission is prohibited when the engine is switched between a reduced-cylinder operation and an all-cylinder operation.

According to the configuration disclosed in Patent Literature 1, the amount of change in the engine speed is reduced by prohibiting a gear position shifting operation during the switching operation. This may make it possible to open or close an intended valve first.

In the configuration disclosed in Patent Literature 1, however, the engine and the power transmission unit may be kept in a connected state, regardless of a switching request to a neutral range by the driver, for instance. This may give a sense of incongruity to the driver.

In view of the above, an object of the present invention is to provide an engine control device, which enables to open or close an intended valve first, while releasing connection between an engine and a power transmission unit in response to a driver's request at the time of switching between a reduced-cylinder operation and an all-cylinder operation.

Solution to Problem

In view of the above, the present invention provides an engine control device to be provided in a vehicle, the vehicle being provided with an engine and a power transmission unit, the engine including a plurality of cylinders, each of which is provided with an intake valve and an exhaust valve, the cylinders being configured to perform combustion of a fuel-air mixture, the engine being operative to switch between an all-cylinder operation in which combustion of the fuel-air mixture is performed in all the cylinders, and a reduced-cylinder operation in which combustion in at least one of the cylinders is stopped and the at least one cylinder is deactivated, the power transmission unit being connected to the engine and configured to transmit power of the engine to wheels. The engine control device includes an operation request determination unit which determines whether the reduced-cylinder operation or the all-cylinder operation is performed based on an operating condition of the engine; a valve stop mechanism which is operative to switch the intake valve and the exhaust valve of the at least one cylinder between an openable/closable state and a closed state; a valve control unit which controls the valve stop mechanism in such a manner that the intake valve and the exhaust valve of the at least one cylinder are set to the openable/closable state when the engine is in the all-cylinder operation, and that the intake valve and the exhaust valve of the at least one cylinder are set to the closed state when the engine is in the reduced-cylinder operation; and an engine speed control unit which controls an engine speed. The valve stop mechanism starts switching the states of the intake valve and the exhaust valve of the at least one cylinder when the operation request determination unit determines a presence of a switching request from one of the reduced-cylinder operation and the all-cylinder operation to the other thereof. The engine speed control unit controls the engine speed in such a manner that an amount of change in the engine speed with respect to time is reduced, as compared with a case in which a specific condition is not satisfied, when the specific condition that the switching by the valve stop mechanism is not completed, and that connection between the engine and the power transmission unit is released is satisfied after the operation request determination unit determines the presence of the switching request.

In the device having the aforementioned configuration, when a specific condition that switching the opening and closing states of an intake valve and an exhaust valve of at least one of the cylinders by the valve stop mechanism is not completed, and that connection between the engine and the power transmission unit is released is established at the time of issuance of a switching request from one of a reduced-cylinder operation and an all-cylinder operation to the other thereof, the amount of change in the engine speed with respect to time is reduced. This makes it possible to open or close an intended valve first, while releasing connection between the engine and the power transmission unit.

BRIEF DESCRIPTION OF DRAWINGS

FIG. 5A is a diagram for describing a drive timing of the valve stop mechanism when opening an exhaust valve is resumed;

FIG. 5B is a diagram for describing a drive timing of the valve stop mechanism when opening an intake valve is resumed;

FIG. 7A is a diagram for describing the opening and closing states of an intake valve and an exhaust valve when the intake valve is opened first at the time of switching from a reduced-cylinder operation to an all-cylinder operation in a condition that the engine speed is kept constant;

FIG. 7B is a diagram for describing a drawback, which may occur accompanied by release of connection between the engine and a power transmission unit at the time of issuance of a switching request from a reduced-cylinder operation to an all-cylinder operation;

FIG. 8A is a diagram for describing the opening and closing states of an intake valve and an exhaust valve when the intake valve is opened first at the time of switching from a reduced-cylinder operation to an all-cylinder operation in a condition that the engine speed is kept constant;

FIG. 8B is a diagram for describing a drawback, which may occur accompanied by release of connection between the engine and the power transmission unit at the time of issuance of a switching request from a reduced-cylinder operation to an all-cylinder operation;

FIG. 9 is a flowchart illustrating a former half portion of a control procedure of an engine speed control unit;

DESCRIPTION OF EMBODIMENTS (1) Overall Configuration

Figure 1:
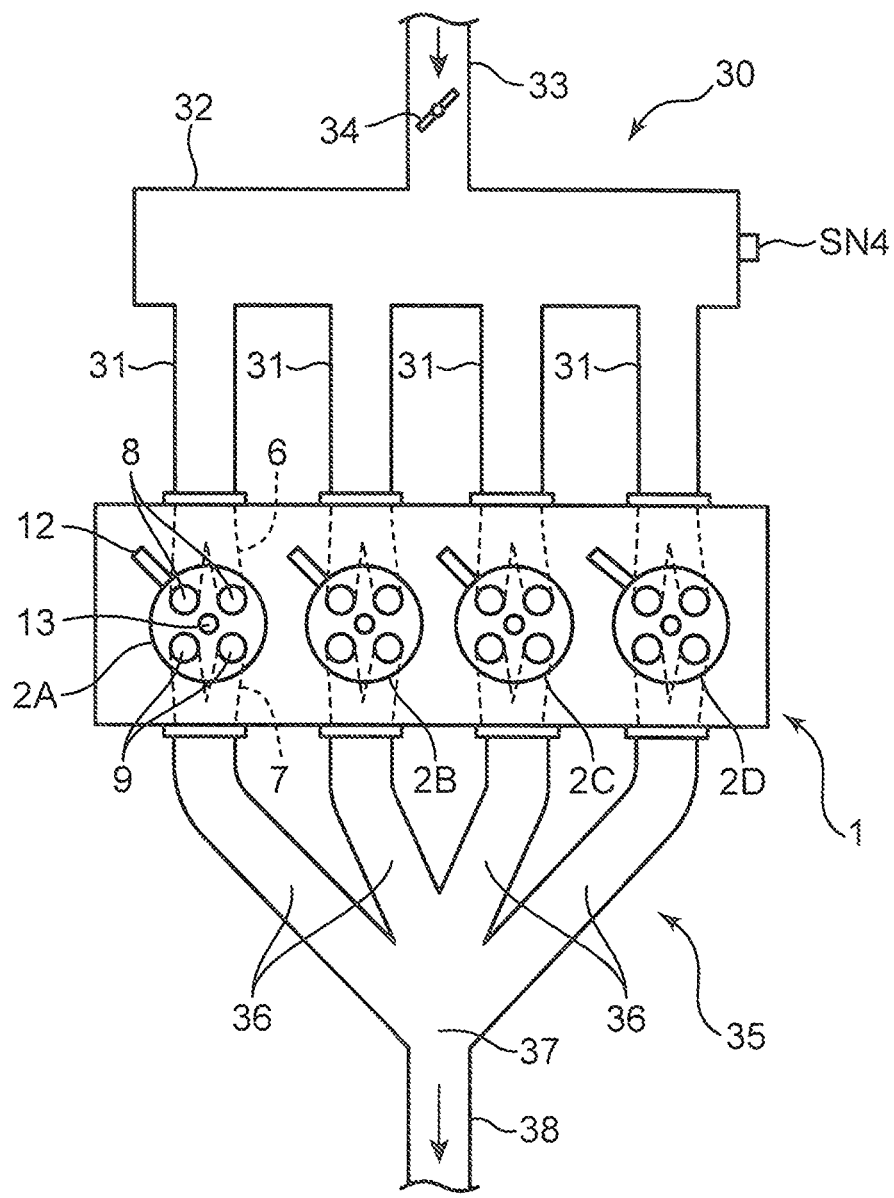
FIG. 1 is a diagram illustrating an embodiment of an engine to which an engine control device of the present invention is applied.
Figure 2:
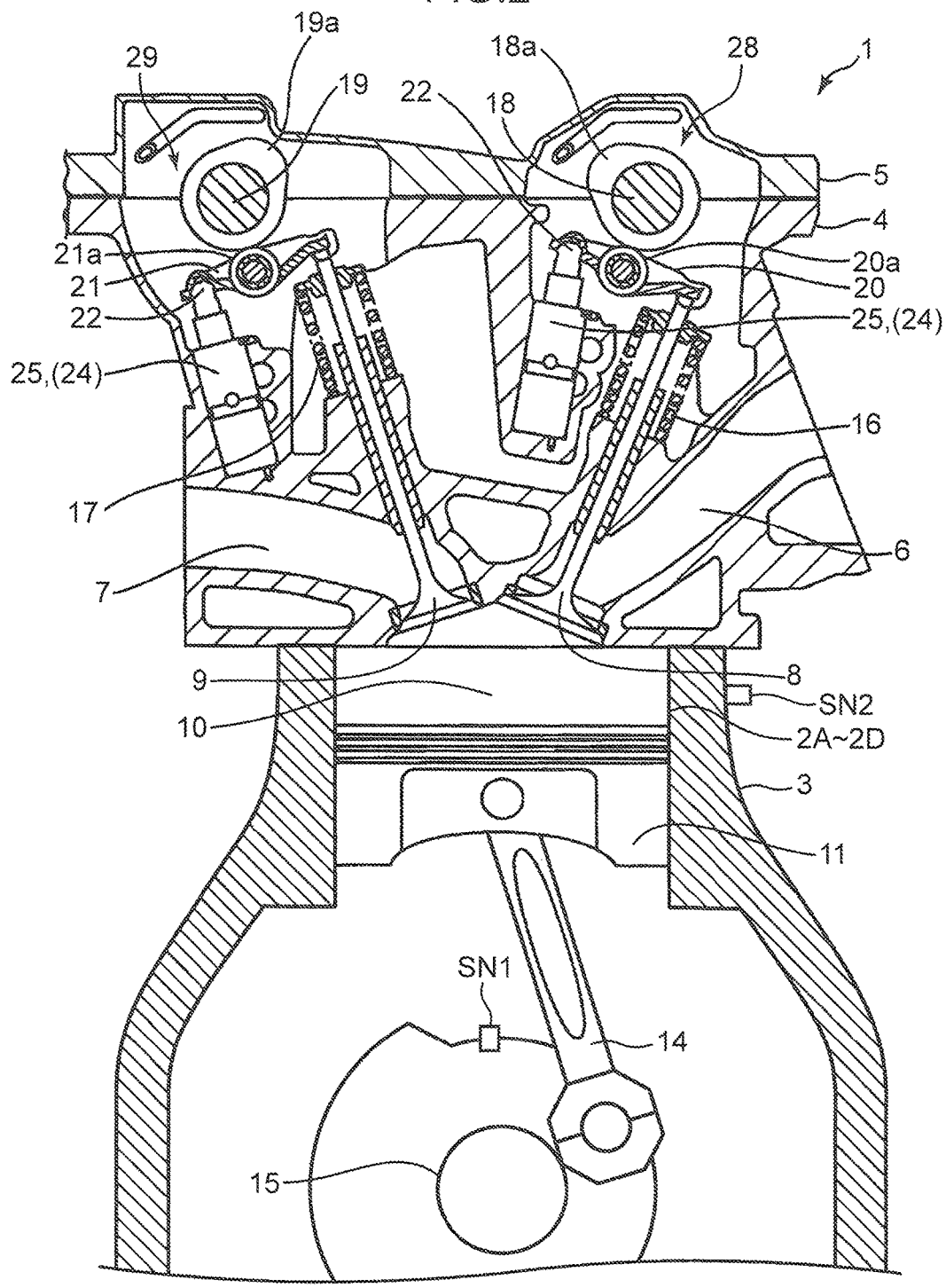
FIG. 2 is a schematic sectional view of the engine illustrated in FIG. 1.

FIG. 1 and FIG. 2 are diagrams illustrating an embodiment of an engine to which a control device of the present invention is applied. The engine illustrated in FIG. 1 and FIG. 2 is a 4-cycline multi-cylinder gasoline engine to be mounted in a vehicle, as a power source for travelling. Specifically, as illustrated in FIG. 1, the engine includes an in-line 4-cylinder engine body 1 having four cylinders 4A, 4B, 4C, and 4D arrayed in a row, an intake passage 30 for introducing air to the engine body 1, and an exhaust passage 35 for discharging exhaust gas generated in the engine body 1.

As illustrated in FIG. 2, the engine body 1 includes a cylinder block 3 in which the four cylinders 2A to 2D are disposed, a cylinder head 4 disposed above the cylinder block 3, a cam cap 5 disposed above the cylinder head 4, and pistons 11 which are reciprocatably received in the respective cylinders 2A to 2D.

Combustion chambers 10 are formed above the pistons 11. Fuel (fuel containing gasoline as a main component) is supplied from injectors 12 (see FIG. 1) to the combustion chambers 10. The supplied fuel is combusted in the combustion chambers 10, and the pistons 11 reciprocate in the up-down direction by expansion force by the combustion.

The pistons 11 are connected to a crankshaft 15, which is an output shaft of the engine body 1, via connecting rods 14. The crankshaft 15 is rotated around an axis thereof, as the pistons 11 reciprocate.

The injector 12 for injecting fuel (gasoline) into the combustion chamber 10 of each of the cylinders 2A to 2D, and an ignition plug 13 (see FIG. 1) for supplying ignition energy by spark discharge to a fuel-air mixture injected from each of the injectors 12 for combusting the fuel-air mixture are disposed in the cylinder head 4. In the embodiment, an injector 12 per cylinder, namely, four injectors 12 in total are provided. Likewise, an ignition plug 13 per cylinder, namely, four ignition plugs 13 in total are provided.

In the 4-cycle 4-cylinder gasoline engine as described in the embodiment, the piston 11 provided in each of the cylinders 2A to 2D is moved up and down with a phase difference of 180° (180° CA) in terms of the crank angle. Therefore, an ignition timing, namely, a combustion timing at each of the cylinders 2A to 2D is also a timing whose phase is displaced by 180° CA. Specifically, when it is assumed that the cylinder 2A is a first cylinder, the cylinder 2B is a second cylinder, the cylinder 2C is a third cylinder, and the cylinder 2D is a fourth cylinder in the order from the left side in FIG. 1, fuel is injected from the injectors 12 in the order of the first cylinder 2A, the third cylinder 2C, the fourth cylinder 2D, and the second cylinder 2B, and ignition of a fuel-air mixture is performed by the ignition plugs 13 in this order for combusting the fuel-air mixture in this order.

The engine in the embodiment is a variable cylinder engine capable of performing an operation of deactivating two of the four cylinders 2A to 2D, and activating the remaining two of the four cylinders 2A to 2D, in other words, capable of performing a reduced-cylinder operation. Therefore, the aforementioned order of combustion (order of ignition) is used when a normal operation other than a reduced-cylinder operation is performed (i.e. when an all-cylinder operation of activating all the four cylinders 2A to 2D is performed). On the other hand, when a reduced cylinder operation is performed, fuel injection by an injector 12 and an ignition operation by an ignition plug 13 are prohibited in the two cylinders, whose order of combustion (order of ignition) is not consecutive (specific cylinders, in the embodiment, the first cylinder 2A and the fourth cylinder 2D), and combustion is performed in every other cylinder. In the following, a cylinder whose ignition operation is prohibited when a reduced-cylinder operation is performed may be referred to as a deactivated cylinder.

An intake port 6 for introducing air (intake air) to be supplied from the intake passage 30 to the combustion chamber 10 of each of the cylinders 2A to 2D, and an exhaust port 7 for discharging exhaust gas generated in the combustion chamber 10 of each of the cylinders 2A to 2D to the exhaust passage 35 are provided in the cylinder head 4. Further, an intake valve 8 for changing a state of intake air to be introduced to the intake port 6 by opening or closing the opening of the intake port 6 on the side of the combustion chamber 10, and an exhaust valve 9 for changing a state of exhaust gas to be discharged from the exhaust port 7 by opening or closing the opening of the exhaust port 7 on the side of the combustion chamber 10 are provided in the cylinder head 4. In the embodiment, two intake valves 8 per cylinder, namely, eight intake valves 8 in total are provided, and two exhaust valves 9 per cylinder, namely, eight exhaust valves 9 in total are provided.

The intake passage 30 includes four independent intake passages 31 for communicating with the intake ports 6 of the cylinders 2A to 2D, a surge tank 32 commonly connected to upstream ends of the independent intake passages 31 (upstream ends in the flow direction of intake air), and an intake pipe 33 extending from the surge tank 32 toward the upstream side. A throttle valve 34 for regulating the flow rate of intake air to be introduced to the engine body 1 is provided at a midway of the intake pipe 33.

The exhaust passage 35 includes four independent exhaust passages 36 for communicating with the exhaust ports 7 of the cylinders 2A to 2D, a collecting portion 37 at which downstream ends of the independent exhaust passages 36 (downstream ends in the flow direction of exhaust gas) are merged, and an exhaust pipe 38 extending from the collecting portion 37 toward the downstream side.

A transmission (a power transmission unit, not illustrated) for transmitting power of the engine to wheels is disposed between the engine having the aforementioned configuration, and the wheels. A connection state between the transmission and the engine is released when an operation member such as a shift lever provided in a vehicle compartment is operated by the driver, and when the transmission range is switched to the neutral range. When the connection is released, power transmission from the engine to the wheels is stopped. Further, in the embodiment, a clutch pedal (not illustrated) capable of releasing a connection state between the transmission and the engine is provided. Also, when the clutch pedal is depressed by the driver (when the clutch is disengaged), the connection state between the transmission and the engine is released, and power transmission from the engine to the wheels is stopped.

(2) Valve Train Mechanism

Next, a mechanism for opening and closing an intake valve 8 and an exhaust valve 9 is described in detail using FIG. 2, FIG. 3A to FIG. 3C, and FIG. 4. Intake valves 8 and exhaust valves 9 are driven to open and close by each pair of valve train mechanisms 28 and 29 (see FIG. 2) provided in the cylinder head 4 in association with rotation of the crankshaft 15.

The valve train mechanism 28 for an intake valve 8 includes a return spring 16 for urging the intake valve 8 in the closing direction (upward in FIG. 2), a camshaft 18 which is rotated in association with rotation of the crankshaft 15, a cam portion 18a which is integrally rotated with the camshaft 18, a swing arm 20 which is periodically pressed by the cam portion 18a, and a pivot portion 22 as a pivot point of the swing arm 20. Further, the valve train mechanism 28 for an intake valve 8 includes a cam follower 20a, which is provided rotatably substantially at a middle portion of the swing arm 20.

Likewise, the valve train mechanism 29 for an exhaust valve 9 includes a return spring 17 for urging the exhaust valve 9 in the closing direction (upward in FIG. 2), a camshaft 19 which is rotated in association with rotation of the crankshaft 15, a cam portion 19a which is integrally rotated with the camshaft 19, a swing arm 21 which is periodically pressed by the cam portion 19a, and a pivot portion 22 as a pivot point of the swing arm 21. Further, the valve train mechanism 29 for an exhaust valve 9 includes a cam follower 21a, which is provided rotatably substantially at a middle portion of the swing arm 21.

An intake valve 8 and an exhaust valve 9 are driven to open and close by the valve train mechanisms 28 and 29 as follows. When the camshafts 18 and 19 are rotated as the crankshaft 15 is rotated, the cam followers 20a and 21a are periodically pressed down by the cam portions 18a and 19a. In this case, the swing arms 20 and 21 swing about the pivot portions 22, which support one ends of the swing arms 20 and 21. As the swing arms 20 and 21 swing, the other ends of the swing arms 20 and 21 press the intake valve 8 and the exhaust valve 9 downward against the urging forces of the return springs 16 and 17. As a result, the intake valve 8 and the exhaust valve 9 are opened. When the intake valve 8 and the exhaust valve 9 are opened, the intake valve 8 and the exhaust valve 9 are returned to the closed position by the urging forces of the return springs 16 and 17 accompanied by removal of pressing forces by the cam portions 18a and 19a.

The pivot portions 22 are supported by well-known hydraulic lash adjusters 24 and 25 (hereinafter, abbreviated as HLAs 24 and 25) which automatically adjust the valve clearances to zero. Out of the HLAs 24 and 25, the HLAs 24 automatically adjust the valve clearances of the second cylinder 2B and the third cylinder 2C located at the middle position in the cylinder array direction. The HLAs 25 automatically adjust the valve clearances of the first cylinder 2A and the fourth cylinder 2D located at both ends in the cylinder array direction.

The HLAs 25 for the first cylinder 2A and the fourth cylinder 2D have a function of switching whether opening and closing operations of the intake valves 8 and the exhaust valves 9 are allowed or prohibited depending on whether the engine is in a reduced-cylinder operation or in an all-cylinder operation. When the engine is in an all-cylinder operation, the HLAs 25 allow opening and closing operations of the intake valves 8 and the exhaust valves 9 of the first cylinder 2A and the fourth cylinder 2D as deactivated cylinders. On the other hand, when the engine is in a reduced-cylinder operation, the HLAs 25 prohibit opening and closing operations of the intake valves 8 and the exhaust valves 9 of the first cylinder 2A and the fourth cylinder 2D as deactivated cylinders, and keep the intake valves 8 and the exhaust valves 9 in a closed state. The HLA 25 includes a valve stop mechanism 25a illustrated in FIGS. 3A to 3C, as a mechanism for prohibiting opening and closing operations of each of the intake valve 8 and the exhaust valve 9. Contrary to the above, the HLAs 24 for the second cylinder 2B and the third cylinder 2C are not provided with a valve stop mechanism 25a, and allow opening and closing operations of the intake valves 8 and the exhaust valves 9 all the time. In the following, in order to discriminate the HLAs 24 and 25 from each other, the HLA 25 provided with a valve stop mechanism 25a is particularly referred to as an S-HLA 25 (abbreviation of Switchable-Hydraulic Lash Adjuster).

The valve stop mechanism 25a of the S-HLA 25 includes a bottomed outer cylinder 251, a pair of lock pins 252 which come in and out of two through-holes 251a, which are formed in the periphery of the outer cylinder 251 to face each other, a lock spring 253 which urges the lock pins 252 radially outwardly, and a lost motion spring 254. The pivot portion 22 is accommodated in the outer cylinder 251 to be slidably movable in the axial direction. The lock pins 252 are capable of switching the pivot portion 22 to a locked state or to a lock released state. The lost motion spring 254 is disposed between the inner bottom portion of the outer cylinder 251, and the bottom portion of the pivot portion 22. The lost motion spring 254 presses and urges the pivot portion 22 toward the upper side of the outer cylinder 251.

Figure 3:
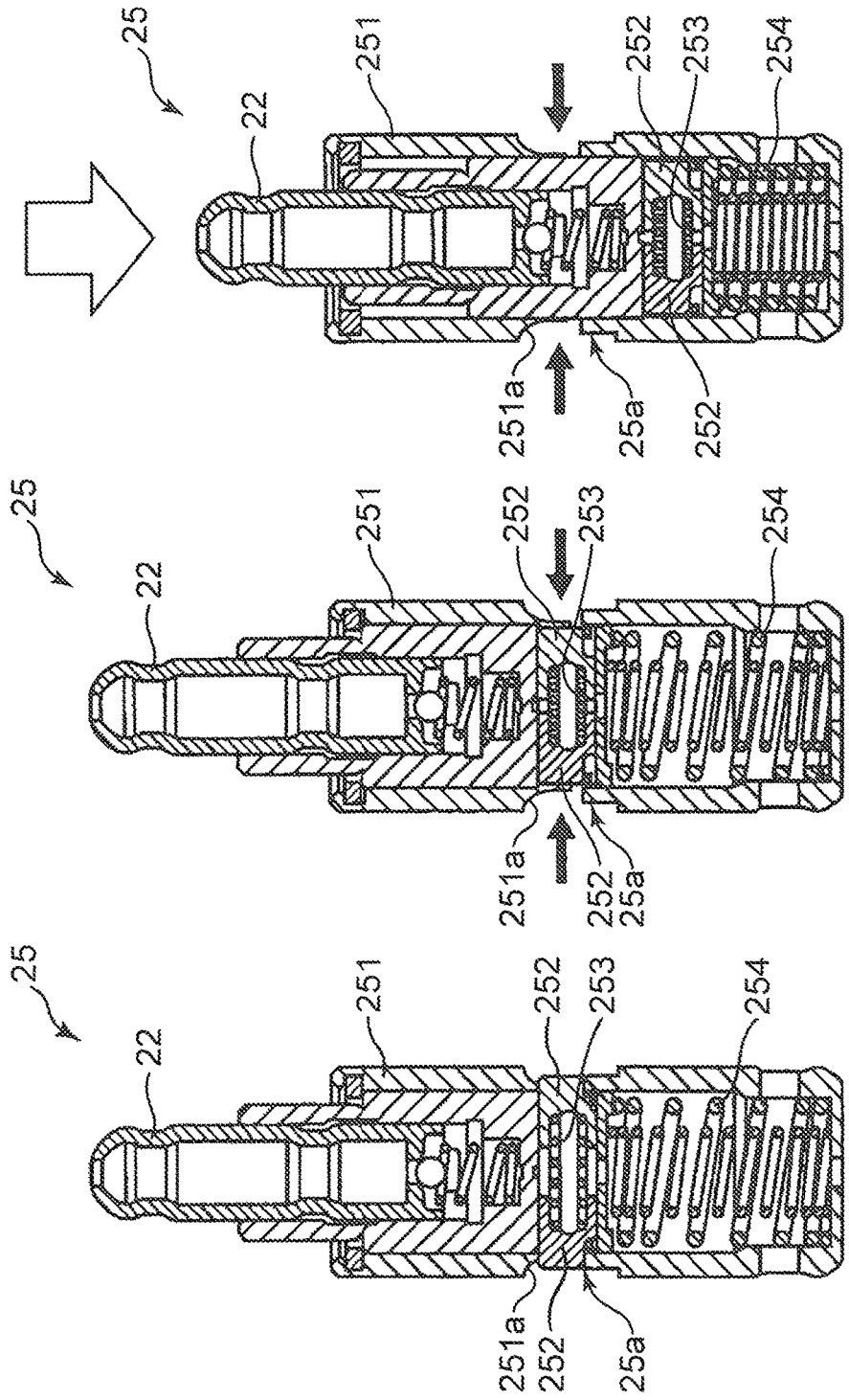
FIG. 3A is a diagram illustrating a valve stop mechanism when a pivot portion is in a locked state.
FIG. 3B is a diagram illustrating the valve stop mechanism before the pivot portion is switched to a lock released state.
FIG. 3C is a diagram illustrating the valve stop mechanism when the pivot portion is in a lock released state.

As illustrated in FIG. 3A, when the lock pins 252 are engaged in the through-holes 251a, the pivot portion 22 is set to a locked state in which the pivot portion 22 is projected upward and fixed thereat. As described above, when the pivot portions 22 are in the locked state, top portions of the pivot portions 22 serve as pivot points of the swing arms 20 and 21. Then, when the cam portions 18a and 19a press the cam followers 20a and 21a downward as a result of rotation of the camshafts 18 and 19, the intake valve 8 and the exhaust valve 9 are moved downward against the urging forces of the return springs 16 and 17. As a result, the intake valve 8 and the exhaust valve 9 are opened. Therefore, when the engine is in an all-cylinder operation in which all the four cylinders 2A to 2D are activated, the valve stop mechanisms 25a cause the pivot portions 22 to a locked state, and opening and closing operations of the intake valves 8 and the exhaust valves 9 of the first cylinder 2A and the fourth cylinder 2D are allowed.

On the other hand, when the paired lock pins 252 are radially and inwardly moved, and come into the through-holes 251a, as illustrated in FIG. 3B, the paired lock pins 252 are moved in a direction toward each other (radially inwardly of the outer cylinder 251) against the tension force of the lock spring 253. As a result, the engagement of the lock pins 252 in the through-holes 251a is released, and the pivot portion 22 is set to a lock released state in which the pivot portion 22 is axially movable.

When the pivot portion 22 is set to a lock released state, a valve stop state as illustrated in FIG. 3C is obtained by pressing the pivot portion 22 downward against the urging force of the lost motion spring 254. Specifically, the return springs 16 and 17 for urging the intake valve 8 and the exhaust valve 9 upward have a larger urging force than the lost motion spring 254 for urging the pivot portion 22 upward. Therefore, when the pivot portions 22 are set to a lock released state as described above, causing the cam portions 18a and 19a to press the cam followers 20a and 21a downward accompanied by rotation of the camshafts 18 and 19 makes it possible to set the top portions of the intake valve 8 and the exhaust valve 9 as pivot points of the swing arms 20 and 21, and to press the pivot portions 22 downward against the urging force of the lost motion springs 254. As a result, the intake valve 8 and and the exhaust valve 9 are not moved any more. In other words, the intake valve 8 and the exhaust valve 9 are held in a closed state. Therefore, when the engine is in a reduced-cylinder operation in which the first cylinder 2A and the fourth cylinder 2D are deactivated, the valve stop mechanisms 25a cause the pivot portions 22 to a lock released state. Then, opening and closing operations of the intake valves 8 and the exhaust valves 9 of the first cylinder 2A and the fourth cylinder 2D are prohibited, and the intake valves 8 and the exhaust valves 9 are kept in a closed state.

Figure 4:
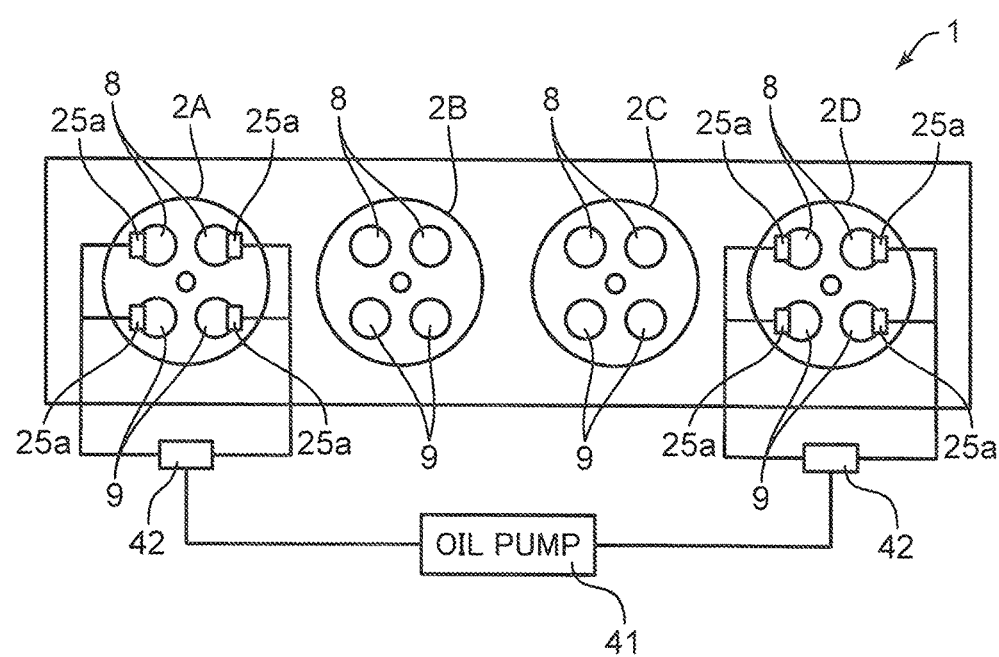
FIG. 4 is a diagram illustrating hydraulic oil passages of the valve stop mechanism.

The valve stop mechanism 25a is of hydraulically driven type. The valve stop mechanism 25a, more specifically, the lock pins 252 of the valve stop mechanism 25a are hydraulically driven. The lock pins 252 come in and out of the through-holes 251a depending on a hydraulic pressure to be supplied. As illustrated in FIG. 4, hydraulic oil is supplied from an oil pump 41 to the valve stop mechanism 25a. A solenoid valve 42 for switching between a state in which hydraulic oil from the oil pump 41 is allowed to flow to the valve stop mechanism 25a, and a state in which hydraulic oil from the oil pump 41 is not allowed to flow to the valve stop mechanism 25a is provided between the oil pump 41 and the valve stop mechanism 25a. When a flow state of hydraulic oil to the valve stop mechanism 25a is switched by the solenoid valve 42, the hydraulic pressure to be supplied from the oil pump 41 to the valve stop mechanism 25a is changed. As described above, in the embodiment, switching the opening and closing states of the intake valves 8 and the exhaust valves 9 by the valve stop mechanisms 25a is implemented by the solenoid valve 42. When the solenoid valve 42 is driven, the valve stop mechanisms 25a start switching the opening and closing states of the intake valves 8 and the exhaust valves 9.

As illustrated in FIG. 4, in the embodiment, a solenoid valve 42 is provided per cylinder, and two solenoid valves 42 in total are provided. One of the solenoid valves 42 simultaneously changes the hydraulic pressure to be supplied to the valve stop mechanisms 25a provided in the intake valves 8 of the first cylinder 2A, and the hydraulic pressure to be supplied to the valve stop mechanisms 25a provided in the exhaust valves 9 of the first cylinder 2A. Further, the other of the solenoid valves 42 simultaneously changes the hydraulic pressure to be supplied to the valve stop mechanisms 25a provided in the intake valves 8 of the fourth cylinder 2D, and the hydraulic pressure to be supplied to the valve stop mechanisms 25a provided in the exhaust valves 9 of the fourth cylinder 2D.

According to the aforementioned configuration, when the intake valves 8 and the exhaust valves 9 of a deactivated cylinder are switched between a closed state and an openable/closable state, it is necessary to cause the valve stop mechanisms 25a to start switching (it is necessary to drive the solenoid valve 42) during an exhaust valve switching time period Tex illustrated in FIG. 5A in order to open the exhaust valves 9 first (when switched from a closed state to an openable/closable state) or to close the exhaust valves 9 first (when switched from an openable/closable state to a closed state) prior to the intake valves 8. Further, it is necessary to cause the valve stop mechanisms 25a to start switching (it is necessary to drive the solenoid valve 42) during an intake valve switching time period Tin illustrated in FIG. 5B in order to open the intake valves 8 first (when switched from a closed state to an openable/closable state) or to close the intake valves 8 first (when switched from an openable/closable state to a closed state) prior to the exhaust valves 9.

Each of FIG. 5A and FIG. 5B illustrates valve lifts of an intake valve 8 and an exhaust valve 9, the exhaust valve switching time period Tex, and the intake valve switching time period Tin, wherein the horizontal axis denotes a crank angle. In FIG. 5A and FIG. 5B, the term IN denotes an intake valve 8 and the term EX denotes an exhaust valve 9.

As illustrated in FIG. 5A, the exhaust valve switching time period Tex is a time period from the timing corresponding to the angle on the advance side than the timing corresponding to the angle IVO_A by a predetermined delay time period t_delay, which is on the retard side than the valve opening start timing IVO of the intake valve 8 by a predetermined angle, to the timing corresponding to the angle on the advance side than the valve opening start timing EVO of the exhaust valve 9 by the delay time period t_delay.

Further, as illustrated in FIG. 5B, the intake valve switching time period Tin is a time period from the timing corresponding to the angle on the advance side than the timing corresponding to the angle EVO_A by the delay time period t_delay, which is on the retard side than the valve opening start timing EVO of the exhaust valve 9 by a predetermined angle, to the timing corresponding to the angle on the advance side than the valve opening start timing IVO of the intake valve 8 by the delay time period t_delay.

The aforementioned delay time period t_delay is a delay time period of a hydraulic operation. Specifically, the valve stop mechanism 25a is of hydraulically driven type. Therefore, there is a certain delay time period during a time period from start of the switching until the switching is completed. Specifically, there is a delay during a time period after the solenoid valve 42 is driven, and the flow state of hydraulic oil to the valve stop mechanism 25a is started to change until the hydraulic pressure to be supplied to the valve stop mechanism 25a changes by a predetermined amount. In view of the above, causing the valve stop mechanism 25a to start switching during each of the time periods Tex and Tin makes it possible to complete the switching the valve stop mechanism 25a during a time period from the timing corresponding to the angle (IVO_A, EVO_A) on the retard side than the valve opening start timing of a valve other than the valve to be opened first or to be closed first by a predetermined angle, to the valve opening start timing (EVO, IVO) of the valve to be opened first or to be closed first. Thus, it is possible to securely open or close an intended valve, while avoiding opening or closing a valve other than the intended valve first.

For instance, when the valve stop mechanism 25a starts switching at a start timing of the exhaust valve switching time period Tex (at a timing on the most advance side during the exhaust valve switching time period Tex), it is possible to complete the switching at the timing corresponding to the angle IVO_A on the retard side than the valve opening start timing IVO of the intake valve 8 by a predetermined angle. This makes it possible to open or close the exhaust valve 9 first, without opening or closing the intake valve 8, whose valve opening start timing IVO has already passed. Further, when the valve stop mechanism 25a starts switching at an end timing of the exhaust valve switching time period Tex (at a timing on the most retard side during the exhaust valve switching time period Tex), it is possible to complete the switching at the valve opening start timing EVO of the exhaust valve 9. Thus, it is possible to open or close the exhaust valve 9 first.

(3) Control System

Next, a control system of the engine is described. The engine in the embodiment is configured such that each part of the engine is controlled in an integrated manner by an ECU (an engine control unit, a control means) 50 illustrated in FIG. 6. The ECU 50 is a well-known microprocessor constituted by a CPU, an ROM, an RAM, and the like.

A plurality of sensors for detecting state quantities of the parts are provided in the engine and in the vehicle. Information from the sensors is input to the ECU 50.

For instance, a crank angle sensor SN1 for detecting a rotational angle and a rotational speed of the crankshaft 15 is provided in the cylinder block 3. The crank angle sensor SN1 outputs a pulse signal, as an unillustrated crank plate, which is integrally rotated with the crankshaft 15, is rotated. The rotational angle (crank angle) of the crankshaft 15, and the engine speed are specified based on the pulse signal.

A cam angle sensor SN2 is provided in the cylinder head 4. The cam angle sensor SN2 outputs a pulse signal, each time a tooth of a signal plate which is integrally rotated with the camshaft (18 or 19) passes. Cylinder discrimination information as to in which cycle, a target cylinder is located is specified based on the pulse signal from the cam angle sensor SN2, and the pulse signal from the crank angle sensor SN1.

An intake air pressure sensor SN3 for detecting a pressure of intake air to be introduced to each of the cylinders 2A to 2D of the engine body 1 is provided in the surge tank 32 of the intake passage 30.

An accelerator pedal position sensor SN4 for detecting an opening angle (an accelerator pedal position) of an unillustrated accelerator pedal to be operated by the driver, a clutch pedal sensor SN5 for detecting a depression amount of the clutch pedal, and a position sensor SN6 for detecting a transmission range are provided in the vehicle.

The ECU 50 is electrically connected to the sensors SN1 to SN6. The ECU 50 acquires the aforementioned various information (a crank angle, an engine speed, cylinder discrimination information, an intake air pressure, an accelerator pedal position, a depression amount of the clutch pedal, and a transmission range) based on a signal to be input from each of the sensors.

Figure 6:
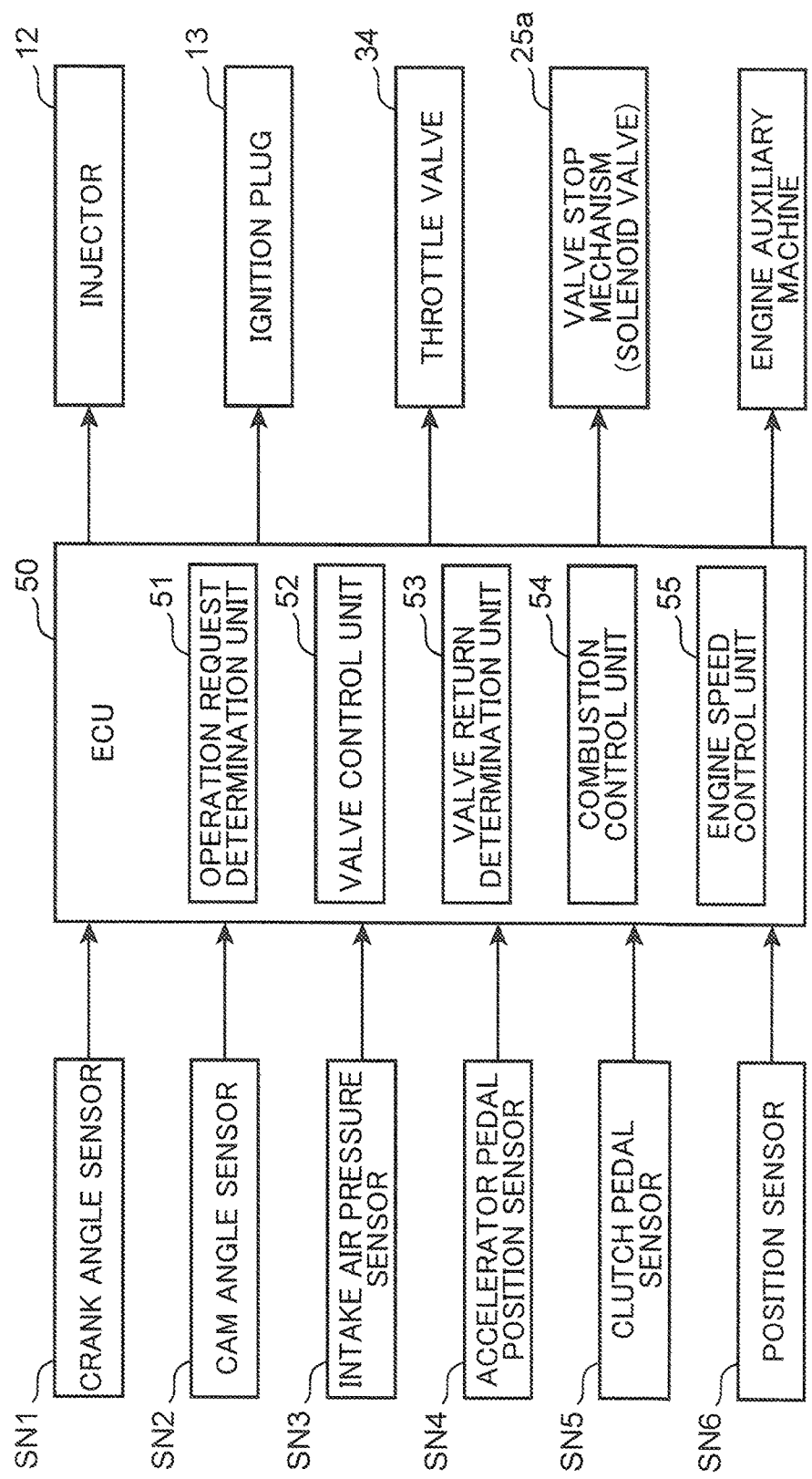
FIG. 6 is a diagram illustrating a control system of the engine illustrated in FIG. 1.

The ECU 50 controls each part of the engine, while executing various determinations and computations based on input signals from the sensors SN1 to SN6. The ECU 50 is electrically connected to the injectors 12, the ignition plugs 13, the throttle valve 34, and the valve stop mechanisms 25a (solenoid valves 42). The ECU 50 outputs a control signal for driving each of the devices, based on results of the computations, and the like. In the embodiment, there is a set of an injector 12 and an ignition plug 13 per cylinder, namely, there are four sets of injectors 12 and ignition plugs 13 in total. In FIG. 6, however, the injectors 12 and the ignition plugs 13 are expressed by one block, respectively. Further, a valve stop mechanism 25a is provided in an S-HLA 25 on each of the intake side and the exhaust side for the first cylinder 2A, and is provided in an S-HLA 25 on each of the intake side and the exhaust side for the fourth cylinder 2D. In FIG. 6, however, the valve stop mechanisms 25a are expressed by one block.

A more specific function of the ECU 50 is described. The ECU 50 includes, as unique functional elements relating to a reduced cylinder operation, an operation request determination unit 51, a valve control unit 52, a valve return determination unit 53, a combustion control unit 54, and an engine speed control unit 55.

The operation request determination unit 51 determines whether a reduced-cylinder operation or an all-cylinder operation is performed based on an engine operating condition (such as an engine load or an engine speed) to be specified from a detection value of the accelerator pedal position sensor SN4 or the crank angle sensor SN1. For instance, the operation request determination unit 51 determines the presence of a request for a reduced-cylinder operation, in which the first cylinder 2A and the fourth cylinder 2D are deactivated (in other words, only the second cylinder 2B and the third cylinder 2C are activated) when the engine is in a specific operating condition in which the engine speed and the engine load are relatively low. Conversely, when the engine is in an operating condition other than the aforementioned specific operating condition, the operation request determination unit 51 determines the presence of a request for an all-cylinder operation, in which all the first to fourth cylinders 2A to 2D are activated. When the operating condition is switched as described above, the operation request determination unit 51 determines the presence of a switching request from one of a reduced-cylinder operation and and an all-cylinder operation to the other thereof.

The valve control unit 52 switches operation states of the intake valves 8 and the exhaust valves 9 of the deactivated cylinders (first and fourth cylinders) 2A and 2D (whether the operation state is an openable/closable state or a closed state). Specifically, when the engine is in a reduced-cylinder operation, the valve control unit 52 drives the solenoid valves 42 in such a manner that a hydraulic pressure capable of setting the pivot portions 22 to a lock released state (see FIG. 3C) is supplied to the lock pins 252 so as to keep the intake valves 8 and the exhaust valves 9 of the deactivated cylinders (first and fourth cylinders) 2A and 2D in a closed state by the valve stop mechanisms 25a. On the other hand, when the engine is in an all cylinder operation, the valve control unit 52 drives the solenoid valves 42 in such a manner that a hydraulic pressure capable of setting the pivot portions 22 to a locked state (see FIG. 3A) is supplied to the lock pins 252 so as to set the intake valves 8 and the exhaust valves 9 of the deactivated cylinders (first and fourth cylinders) 2A and 2D to an openable/closable state.

Further, the valve control unit 52 outputs a control signal to the valve stop mechanisms 25a (solenoid valves 42) so as to close the exhaust valves 9 of the deactivated cylinders (first and fourth cylinders) 2A and 2D first prior to the intake valves 8 when a switching request from an all-cylinder operation to a reduced-cylinder operation is issued.

This is for the purpose of keeping the inner pressure of the deactivated cylinders (first and fourth cylinders) 2A and 2D high when the engine is in a reduced-cylinder operation, and reducing engine vibration, which may be generated when the engine is in a reduced-cylinder operation.

Specifically, when the engine is in a reduced-cylinder operation, the pistons 11 reciprocate while keeping both of the intake valves 8 and the exhaust valves 9 of the deactivated cylinders (first and fourth cylinders) 2A and 2D in a closed state. Accompanied by reciprocation of the pistons 11, gas may leak to the outside through a gap between the pistons 11 and the inner walls of the combustion chambers 10, and the inner pressure of the deactivated cylinders (first and fourth cylinders) 2A and 2D may gradually lower. This may increase a difference in the inner pressure between the deactivated cylinders (first and fourth cylinders) 2A and 2D, and the activated cylinders (second and third cylinders) 2B and 2C, and may increase engine vibration.

On the other hand, if air is introduced to the deactivated cylinders (first and fourth cylinders) 2A and 2D, and the introduced air is not discharged, it is possible to keep the inner pressure of the deactivated cylinders (first and fourth cylinders) 2A and 2D high, and to reduce engine vibration. In view of the above, in the embodiment, when a switching request from an all-cylinder operation to a reduced-cylinder operation is issued as described above, the exhaust valves 9 of the deactivated cylinders (first and fourth cylinders) 2A and 2D are set to a closed state first, and then, intake air is introduced to the deactivated cylinders (first and fourth cylinders) 2A and 2D by opening the intake valves 8. Further, the intake valves 8 and the exhaust valves 9 are set to a closed state in a state that the introduced intake air is not discharged.

Specifically, when the operation request determination unit 51 determines the presence of a switching request from an all-cylinder operation to a reduced-cylinder operation, the valve control unit 52 causes the valve stop mechanisms 25a (solenoid valves 42) to start switching during the exhaust valve switching time period Tex. When the timing of issuance of a switching request is deviated from the exhaust valve switching time period Tex, the valve control unit 52 waits until the exhaust valve switching time period Tex comes, and causes the valve stop mechanisms 25a (solenoid valves 42) to start switching.

Further, when there is a switching request from a reduced-cylinder operation to an all-cylinder operation, the valve control unit 52 controls the valve stop mechanisms 25a (solenoid valves 42) as follows.

As described above, the inner pressure of the deactivated cylinders 2A and 2D gradually lowers during a reduced-cylinder operation. However, in the case where the time period when a reduced-cylinder operation is performed is relatively short, namely, is shorter than a predetermined time period, the inner pressure of the deactivated cylinders 2A and 2D is kept high. Therefore, if the intake valves 8 of the deactivated cylinders (first and fourth cylinders) 2A and 2D are opened first prior to the exhaust valves 9 in the case where the time period when a reduced-cylinder operation is performed is shorter than a predetermined time period, high pressure gas may flow back to the intake passage 30. In view of the above, in the embodiment, in the case where the time period when a reduced-cylinder operation is performed is shorter than a predetermined time period as described above, the exhaust valves 9 of the deactivated cylinders (first and fourth cylinders) 2A and 2D are opened first prior to the intake valves 8 in order to avoid a reverse flow of high pressure gas to the intake passage 30.

On the other hand, when the time period when a reduced-cylinder operation is performed is not shorter than the predetermined time period, the aforementioned reverse flow of high pressure gas to the intake passage 30 does not occur. Therefore, the valve control unit 52 controls to open the valves capable of being opened first, out of the intake valves 8 and the exhaust valves 9 of the deactivated cylinders (first and fourth cylinders) 2A and 2D, as far as the time period when a reduced-cylinder operation is performed is not shorter than the predetermined time period. Specifically, when the switching request is issued during the intake valve switching time period Tin, the valve control unit 52 causes the valve stop mechanisms 25a (solenoid valves 42) to start switching during the intake valve switching time period Tin so as to open the intake valves 8 of the deactivated cylinders (first and fourth cylinders) 2A and 2D first prior to the exhaust valves 9. On the other hand, when the switching request is issued during the exhaust valve switching time period Tex, the valve control unit 52 causes the valve stop mechanisms 25a (solenoid valves 42) to start switching during the exhaust valve switching time period Tex so as to open the exhaust valves 9 of the deactivated cylinders (first and fourth cylinders) 2A and 2D first prior to the intake valves 8.

The valve return determination unit 53 determines whether or not the exhaust valves 9 of the deactivated cylinders (first and fourth cylinders) 2A and 2D are normally opened, in other words, whether opening and closing operations of the exhaust valves 9 are returned to a normal state at the time of switching from a reduced-cylinder operation to an all-cylinder operation. In the embodiment, the aforementioned determination is performed by using a phenomenon that high pressure gas that is not discharged and remains in the deactivated cylinders flows back to the intake passage 30, and the intake air pressure temporarily increases when the exhaust valve 9 of the deactivated cylinders (first and fourth cylinders) 2A and 2D are in a failed state, specifically, are kept in a closed state. The valve return determination unit 53 determines that the exhaust valves 9 are not returned to a normal state, assuming that there is a reverse flow of high pressure gas, when the amount of change in the intake air pressure (a detection value of the intake air pressure sensor SN3) before and after a timing at which the intake valves 8 of the deactivated cylinders (first and fourth cylinders) 2A and 2D are started to open is larger than a predetermined value.

It is possible to use a variety of state quantities other than the above, as specific parameters relating to an intake air pressure for use in the aforementioned determination. For instance, it is possible to use an absolute value of intake air pressure, and to perform the determination based on a difference between the absolute value, and a predetermined value or an intake air pressure at a time close to the valve opening start timing of the intake valves 8 of an activated cylinder.

When the exhaust valves 9 are in a failed state, specifically are kept in a closed state at the time of switching from a reduced-cylinder operation to an all-cylinder operation, as far as the inner pressure of the deactivated cylinders (first and fourth cylinders) 2A and 2D is kept high, high pressure gas may flow back to the intake passage 30 at the point of time when the intake valves 8 are opened first. In view of the above, in the embodiment, the valve return determination unit 53 performs the aforementioned determination with respect to the exhaust valves 9, based on the intake air pressure to be obtained when the intake valves 8 are opened first, after the engine is returned to an all-cylinder operation, as far as a time period when a reduced-cylinder operation is performed is shorter than a predetermined time period, and when it is assumed that the inner pressure of the deactivated cylinders (first and fourth cylinders) 2A and 2D is kept high.

On the other hand, when the inner pressure of the deactivated cylinders (first and fourth cylinders) 2A and 2D lowers, even if the exhaust valves 9 are in a failed state, specifically, are kept in a closed state, high pressure gas may not flow back to the intake passage 30 at the point of time when the intake valves 8 are opened first. Therefore, if the aforementioned determination relating to the exhaust valves 9 is performed based on an intake air pressure to be obtained at the point of time when the intake valves 8 are opened first, it may be erroneously determined that the exhaust valves 9 are returned to a normal state and opened, regardless that the exhaust valves 9 are in a failed state i.e. are kept in a closed state.

In view of the above, in the embodiment, when a time period when a reduced-cylinder operation is performed is not shorter than a predetermined time period, and it is assumed that the inner pressure of the deactivated cylinders 2A and 2D lowers, the aforementioned determination is performed, based on an intake air pressure, which is obtained by the second time measurement and thereafter. Performing the aforementioned control causes the intake valves 8 to temporarily open, and makes it possible to introduce fresh intake air into the deactivated cylinders (first and fourth cylinders) 2A and 2D. In this case, if the exhaust valves 9 are not opened, the intake air pressure is detected to be high before and after the valve opening start timing of the intake valve 8, accompanied by compression of the intake air during an exhaust cycle. This makes it possible to appropriately determine the opening and closing states of the exhaust valves 9.

The combustion control unit 54 switches the control of the injectors 12 and the ignition plugs 13 of the deactivated cylinders (first and fourth cylinders) 2A and 2D depending on whether the engine is in a reduced-cylinder operation or in an all-cylinder operation.

When the engine is in an all-cylinder operation, the combustion control unit 54 drives the injectors 12 and the ignition plugs 13 of all the cylinders 2A to 2D to execute fuel injection and ignition, and to combust a fuel-air mixture in all the cylinders 2A to 2D.

On the other hand, when the engine is in a reduced-cylinder operation, the combustion control unit 54 stops driving of the injectors 12 and the ignition plugs 13 of the cylinders to be deactivated i.e. the first and fourth cylinders 2A and 2D in order to stop combustion of a fuel-air mixture in the deactivated cylinders.

Further, at the time of switching from a reduced-cylinder operation to an all-cylinder operation, the combustion control unit 54 resumes fuel injection and ignition in the deactivated cylinders 2A and 2D after the valve return determination unit 53 confirms that the exhaust valves 9 of the deactivated cylinders (first and fourth cylinders) 2A and 2D are returned to a normal state so as to avoid so-called backfire. Specifically, if the fuel injection and the ignition are resumed in a state that the exhaust valves 9 are not returned to a normal state (i.e. are kept in a closed state), and combustion is resumed in the deactivated cylinders (first and fourth cylinders) 2A and 2D, high temperature gas generated by the combustion may flow back to the intake passage 30 when the intake valves 8 are opened next. In view of the above, the combustion control unit 54 resumes combustion after the combustion control unit 54 confirms that the exhaust valves 9 are returned to a normal state.

The engine speed control unit 55 controls the engine output i.e. the engine speed and the engine torque to an appropriate value depending on an operating condition. When a specific condition that switching the opening and closing states of the intake valves 8 and the exhaust valves 9 of the deactivated cylinders (first and fourth cylinders) 2A and 2D by the valve stop mechanisms 25a is not completed, and that connection between the engine and the transmission is released is satisfied at the time of issuance of a switching request from one of a reduced-cylinder operation and an all-cylinder operation to the other thereof, the engine speed control unit 55 controls to keep the engine speed constant so as to avoid a drawback that the intend valves cannot be opened or closed first as described above.

(4) Engine Speed Control Unit

First of all, there is described a drawback involved when the engine speed is not controlled in the case where a specific condition that switching the states of the intake valves 8 and the exhaust valves 9 of the deactivated cylinders (first and fourth cylinders) 2A and 2D by the valve stop mechanisms 25a is not completed, and that connection between the engine and the transmission is released is satisfied after issuance of a switching request from one of a reduced-cylinder operation to an all-cylinder operation to the other thereof, using FIG. 7A, FIG. 7B, FIG. 8A, and FIG. 8B.

FIG. 7A and FIG. 7B are diagrams illustrating the opening and closing states of the intake valves 8 and the exhaust valves 9 of the deactivated cylinders 2A and 2D at the time of switching from a reduced-cylinder operation to an all-cylinder operation, wherein the horizontal axis denotes a time, in place of a crank angle. In FIG. 7A and FIG. 7B, the broken lines denote that the intake valves 8 and the exhaust valves 9 are closed, and the solid lines denote that the intake valves 8 and the exhaust valves 9 are opened. Further, FIG. 7A, FIG. 7B, FIG. 8A, and FIG. 8B are diagrams when the valve control unit 52 executes a control of opening the valves capable of being opened earlier accompanied by issuance of a switching request from a reduced-cylinder operation to an all-cylinder operation when a time period during which a reduced-cylinder operation is performed is not shorter than a predetermined time period. Further, FIG. 7A, FIG. 7B, FIG. 8A, and FIG. 8B are diagrams when a switching request is issued during the intake valve switching time period Tin, and when the valve control unit 52 outputs a control signal to the valve stop mechanisms 25a (solenoid valves 42) so as to open the intake valves 8 first.

FIG. 7A is a diagram when the engine speed is kept substantially constant, without release of connection between the engine and the transmission before and after issuance of a switching request from a reduced-cylinder operation to an all-cylinder operation. FIG. 7B is a diagram in contrast to FIG. 7A, wherein the engine speed drastically increases accompanied by release of connection between the engine and the transmission immediately after issuance of a switching request from a reduced-cylinder operation to an all-cylinder operation.

FIG. 8A is a diagram when the engine speed is kept substantially constant, without release of connection between the engine and the transmission before and after issuance of a switching request from a reduced-cylinder operation to an all-cylinder operation. FIG. 8B is a diagram in contrast to FIG. 8A, wherein the engine speed drastically decreases accompanied by release of connection between the engine and the transmission immediately after issuance of a switching request from a reduced-cylinder operation to an all-cylinder operation.

First of all, comparison is made between FIG. 7A and FIG. 7B.

As illustrated in FIG. 7A, as far as the engine speed is substantially constant before and after issuance of a switching request, causing the valve stop mechanisms 25a to start switching the intake valves 8 and the exhaust valves 9 concurrently with the switching request, which is issued during the intake valve switching time period Tin makes it possible to set a timing at which switching by the valve stop mechanisms 25a is completed (a timing upon lapse of a time period t_delay of a hydraulic operation from the time when switching by the valve stop mechanisms 25a is started) within a time period from the timing corresponding to the angle EVO_A on the retard side than the valve opening start timing of the exhaust valve 9 by a predetermined time, to the valve opening start timing IVO of the intake valve 8. Thus, it is possible to open the intake valve 8 first as instructed by the valve control unit 52.

On the other hand, as illustrated in FIG. 7B, when connection between the engine and the transmission is released as a result of clutch disengagement immediately after issuance of a switching request, and when the engine speed drastically increases accompanied by accelerator pedal depression, a timing at which switching by the valve stop mechanisms 25a is completed (a timing upon lapse of a delay time period t_delay of a hydraulic operation from the time when switching by the valve stop mechanisms 25a is started) becomes a timing on the retard side than the valve opening start timing IVO of the intake valve 8. Specifically, switching by the valve stop mechanisms 25a is not completed by the valve opening start timing IVO of the intake valve 8. In this case, the exhaust valves 9 are opened first, in place of the intake valves 8 instructed by the valve control unit 52.

Next, comparison is made between FIG. 8A and FIG. 8B.

In FIG. 8A, as described above, it is possible to complete switching by the valve stop mechanisms 25a during a time period from the timing corresponding to the angle EVO_A on the retard side than the valve opening start timing of the exhaust valve 9 by a predetermined time, to the valve opening start timing IVO of the intake valve 8, because the engine speed is substantially constant before and after issuance of a switching request. Therefore, it is possible to open the intake valves 8 first as instructed by the valve control unit 52.

On the other hand, as illustrated in FIG. 8B, when connection between the engine and the transmission is released as a result of clutch disengagement or as a result of switching the transmission range to the neutral range in a state that the accelerator pedal is not depressed immediately after issuance of a switching request, and when the engine speed drastically decreases accompanied by release of connection, a timing at which switching by the valve stop mechanisms 25a is completed (a timing upon lapse of a delay time period t_delay of a hydraulic operation from the time when switching by the valve stop mechanisms 25a is started) becomes a timing on the advance side than the valve opening start timing EVO of the exhaust valve 9. As a result, switching by the valve stop mechanisms 25a is completed before the valve opening start timing EVO of the exhaust valve 9. This may cause the exhaust valves 9 to open first, in place of the intake valves 8 instructed by the valve control unit 52.

As described above, when the engine speed drastically changes accompanied by release of connection between the engine and the transmission before switching the states of the intake valves 8 and the exhaust valves 9 of the deactivated cylinders 2A and 2D by the valve stop mechanisms 25a is completed at the time of issuance of a switching request from a reduced-cylinder operation to an all-cylinder operation, valves other than the intended valves may be opened first.

In the foregoing description, a drawback involved when the valve control unit 52 instructs the intake valves 8 to open first is described. The same drawback as described above may occur when the valve control unit 52 instructs the exhaust valves 9 to open first. For instance, as described above, when the exhaust valves 9 are opened first regardless of an instruction to open the intake valves 8 first, the valve return determination unit 53 may perform the aforementioned determination, regarding a timing at which the intake valves 8 are actually opened for the second time as a timing at which the intake valves 8 are opened for the first time. Thus, the valve return determination unit 53 may erroneously determine the state of the exhaust valves 9. Further, when the intake valves 8 are opened first regardless of an instruction to open the exhaust valves 9 first, high pressure gas in the deactivated cylinders 2A and 2D may flow back to the intake passage 30.

Further, in the foregoing description, a case is described in which connection between the engine and the transmission is released immediately after issuance of a switching request from a reduced-cylinder operation to an all-cylinder operation. The same drawback that intended valves are not opened or closed first as described above may occur when a switching request is issued during a time period when connection between the engine and the transmission is released, and when the engine speed drastically changes. Further, the aforementioned drawback may also occur at the time of issuance of a switching request from an all-cylinder operation to a reduced-cylinder operation.

Next, a control procedure to be performed by the engine speed control unit 55 is described using the flowcharts of FIG. 9 to FIG. 12. In the specification, a switching flag F illustrated in FIG. 9 is a flag, in which F=1 during a time period until switching the operation states of the intake valves 8 and the exhaust valves 9 by the valve stop mechanisms 25a is completed after issuance of a switching request from one of a reduced-cylinder operation and an all-cylinder operation to the other thereof, and F=0 unless otherwise.

As illustrated in FIG. 9, first of all, the engine speed control unit 55 determines whether or not the switching flag F=1 in Step S1.

When the determination result in Step S1 is NO, and the switching flag F=0, the procedure proceeds to Step S3.

In Step S3, the engine speed control unit 55 determines whether or not a switching request from one of a reduced-cylinder operation and an all-cylinder operation to the other thereof is issued. When the determination result in Step S3 is YES, the engine speed control unit 55 proceeds to Step S5 after setting the switching flag F to 1 in Step S4. Immediately after the switching flag F is changed from 0 to 1, switching the operation states of the intake valves 8 and the exhaust valves 9 by the valve stop mechanisms 25a has just started, and is not yet completed. On the other hand, when the determination result in Step S3 is NO, and when there is no switching request, the engine speed control unit 55 proceeds to Step S7, and sets the switching flag to 0 (keeps the flag F=0). After Step S7, the engine speed control unit 55 proceeds to Step S8.

In Step S8, the engine speed control unit 55 calculates a normal target engine torque according to a procedure to be described later, and sets the calculated torque as a target engine torque. After Step S8, the procedure proceeds to Step S10 illustrated in FIG. 10.

On the other hand, when the determination result in Step S1 is YES, and when the switching flag F=1, the procedure proceeds to Step S2.

In Step S2, the engine speed control unit 55 determines whether or not switching the operation states of the intake valves 8 and the exhaust valves 9 by the valve stop mechanisms 25a is not completed. When the determination result in Step S2 is NO, and when the switching is completed, the engine speed control unit 55 proceeds to Step S7. Then, after the switching flag F is set to 0 in Step S7, the procedure proceeds to Step S8. On the other hand, when the determination result in Step S2 is YES, and when the switching is not completed, the engine speed control unit 55 proceeds to Step S5.

In Step S5, the engine speed control unit 55 determines whether or not connection between the engine and the transmission is released. The determination is performed based on a signal from the clutch pedal sensor SN5, and a signal from the position sensor SN6.

When the determination result in Step S5 is NO, and the engine and the transmission are connected, the engine speed control unit 55 proceeds to Step S8.

On the other hand, when the determination result in Step S5 is YES, and when connection between the engine and the transmission is released, the engine speed control unit 55 proceeds to Step S6. In Step S6, the engine speed control unit 55 calculates a switching-time target engine torque according to a procedure to be described later, and sets the calculated torque as a target engine torque. After Step S6, the procedure proceeds to Step S10 illustrated in FIG. 10.

Figure 10:
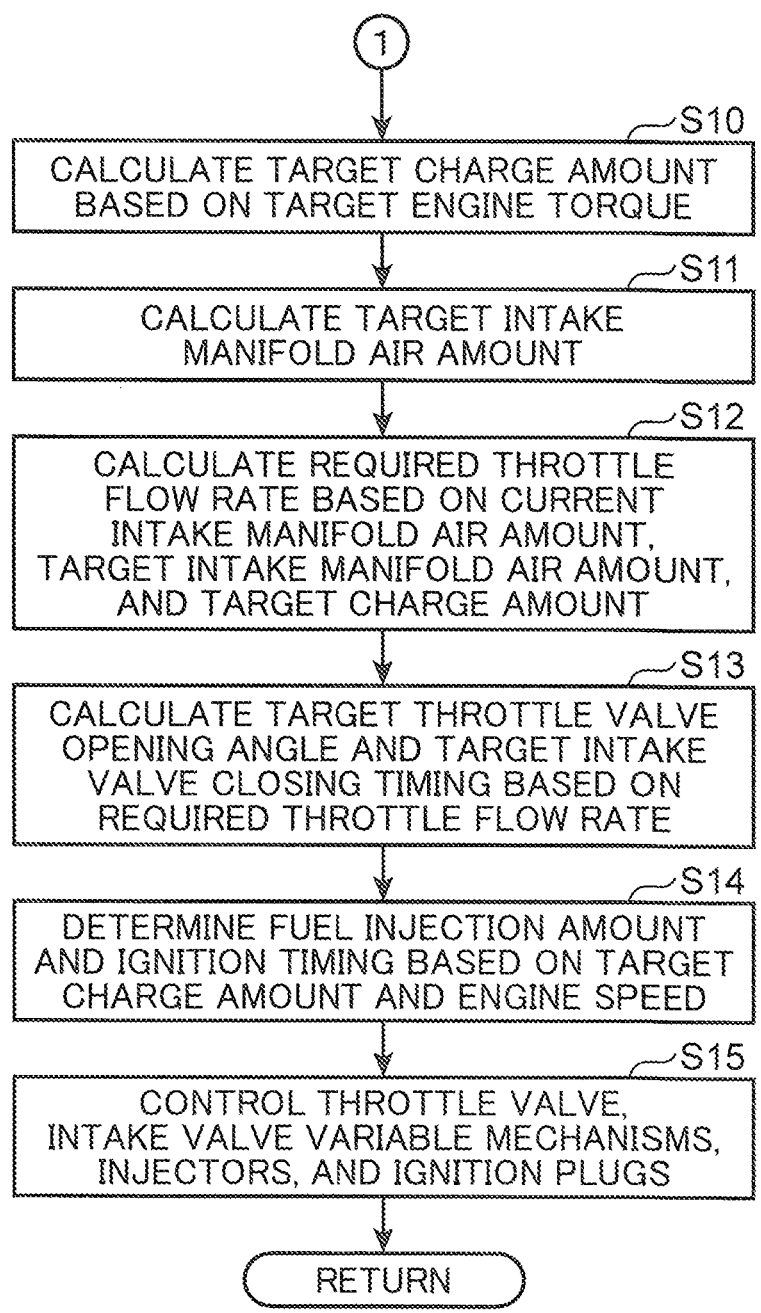
FIG. 10 is a flowchart illustrating a latter half portion of the control procedure of the engine speed control unit.

As illustrated in FIG. 10, in Step S10, the engine speed control unit 55 calculates a target charge amount based on the target engine torque set in Step S6 or in Step S8. As described above, when the procedure proceeds from Step S6 to Step S10, the target engine torque serves as a switching-time target engine torque. When the procedure proceeds from Step S8 to Step S10, the target engine torque serves as a normal engine torque. The target charge amount is a target value of the amount of air to be drawn into each of the cylinders 2A to 2D. After Step S10, the procedure proceeds to Step S11.

In Step S11, the engine speed control unit 55 calculates a target amount of intake manifold air, which is necessary for obtaining the target charge amount calculated in Step S10. The target amount of intake manifold air is a target value of the amount of intake manifold air, which is the amount of air passing through the intake passage 30. The target amount of intake manifold air is calculated based on a target charge amount and an operating condition of the engine. For instance, a reference volumetric efficiency of the surge tank is calculated based on the engine speed, the opening and closing timings of the intake valves 8, and the like. The target amount of intake manifold air is calculated based on the reference volumetric efficiency of the surge tank and the target charge amount. After Step S11, the procedure proceeds to Step S12.

In Step S12, the engine speed control unit 55 calculates a required throttle flow rate based on a current amount of intake manifold air (current intake manifold air amount), the target amount of intake manifold air calculated in Step S11, and the target charge amount calculated in Step S10. The required throttle flow rate is a target value of the flow rate of air passing through the throttle valve 34. The current amount of intake manifold air is, for instance, detected by a sensor provided in the intake passage 30. After Step S12, the procedure proceeds to Step S13.

In Step S13, the engine speed control unit 55 calculates an opening angle of the throttle valve 34 (a target throttle valve opening angle) at which the flow rate of air passing through the throttle valve 34 reaches the required throttle flow rate, based on the required throttle flow rate calculated in Step S12.

Further, in Step S13, the engine speed control unit 55 calculates a target intake valve closing timing, which is a target value of a valve closing timing of the intake valve 8, based on a target charge amount or the like.

The target throttle opening angle may be calculated by using the Bernoulli's principle, for instance. The flow rate of air passing through the throttle valve 34 is determined by the opening angle of the throttle valve 34, and a pressure ratio between an upstream portion and a downstream portion of the throttle valve 34 (a ratio of pressure of a downstream portion with respect to an upstream portion, hereinafter, referred to as a throttle upstream/downstream pressure ratio). Therefore, it is possible to detect a pressure of an upstream portion of the throttle valve 34 and a pressure of a downstream portion of the throttle valve 34 by a sensor, and to calculate a target throttle opening angle, based on the detection values and a required throttle flow rate. Specifically, an opening angle of the throttle valve 34, a throttle upstream/downstream pressure ratio, and a flow rate of air passing through the throttle valve 34 may be obtained in advance, and a relationship between these parameters may be stored in the ECU 50 as a map. Then, an opening angle of the throttle valve 34, which is associated with the detected throttle upstream/downstream pressure ratio and the required throttle flow rate, may be extracted from the map, and the extracted opening angle of the throttle valve 34 may be set as a target throttle opening angle. For instance, the map is set in such a manner that the opening angle of the throttle valve 34 increases as the throttle upstream/downstream pressure ratio approaches 1 when the flow rate of air passing through the throttle valve 34 is constant. After Step S13, the procedure proceeds to Step S14.

In Step S14, the engine speed control unit 55 determines a fuel injection amount, which is the amount of fuel to be injected from the injectors 12 to each of the cylinders 2A to 2D, based on the target charge amount calculated in Step S10 and the engine speed; and determines ignition timings of the ignition plugs 13. For instance, the engine speed control unit 55 determines the fuel injection amount, based on a predetermined target value of air-fuel ratio (a ratio between air and fuel of the fuel-air mixture in the cylinders), and a target charge amount. Further, ignition timings are determined from a predetermined map between engine speeds and target charge amounts, which is stored in advance. After Step S14, the procedure proceeds to Step S15.

In Step S15, the engine speed control unit 55 drives the throttle valve 34, and drives the valve train mechanisms 28 of the intake valves 8 to obtain the target throttle valve opening angle and the target intake valve closing timing calculated in Step S13. In the embodiment, an intake valve variable mechanism capable of changing the valve closing timing of an intake valve 8 is provided in the valve train mechanism 28 of the intake valve 8. The intake valve variable mechanism changes the valve closing timing of the intake valve 8. Further, in Step S15, the engine speed control unit 55 drives the injectors 12 (a fuel injection mechanism including the injectors 12) so that the fuel injection amount determined in Step S14 is injected, and ignites the ignition plugs 13 at the ignition timing determined in Step S14.

After Step S15, the procedure returns to Step S1.

As described above, in the embodiment, when the determination result in Step S1 is YES and the determination result in Step S2 is YES, the target engine torque is determined to be a switching-time target engine torque; and the throttle valve 34, the intake valve variable mechanisms (valve closing timings of the intake valves 8), the injectors 12, and the ignition plugs 13 are controlled so as to obtain the target engine torque. On the other hand, when the determination result in Step S1 is NO or when the determination result in Step S3 is NO, the target engine torque is determined to be a normal target engine torque; and the throttle valve 34, the intake valve variable mechanisms (valve closing timings of the intake valves 8), the injectors 12, and the ignition plugs 13 are controlled so as to obtain the target engine torque.

Figure 12:
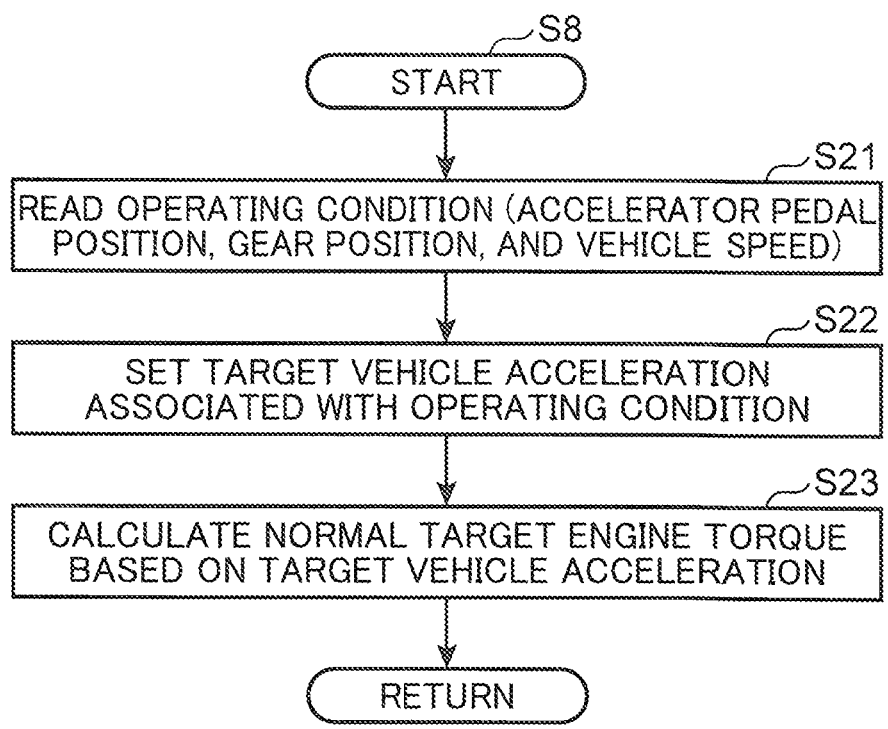
FIG. 12 is a flowchart illustrating a calculation procedure of a normal target engine torque.

The procedure for calculating a normal target engine torque is briefly described using FIG. 12.

First of all, in Step S21, the engine speed control unit 55 reads an operating condition. Specifically, the engine speed control unit 55 reads an accelerator pedal position detected by the accelerator pedal position sensor SN4, a transmission range (a gear position) detected by the position sensor SN6, and a vehicle speed detected by a vehicle speed sensor (not illustrated). The gear position may be calculated based on e.g. a vehicle speed and an engine speed. After Step S21, the procedure proceeds to Step S22.

In Step S22, the engine speed control unit 55 sets a target vehicle acceleration, which is a target value of vehicle acceleration associated with the engine operating condition read in Step S21, based on the read engine operating condition. After Step S22, the procedure proceeds to Step S23.

In Step S23, the engine speed control unit 55 calculates an engine torque at which the target vehicle acceleration set in Step S22 is obtained, based on the target vehicle acceleration set in Step S22, and determines a normal target engine torque.

As described above, the normal target engine torque is calculated based on an accelerator pedal position and a gear position i.e. an operation status by the driver, and based on a vehicle speed i.e. a traveling condition of the vehicle. Thus, the normal target engine torque is set to be an engine torque associated with these parameters.

Figure 11:
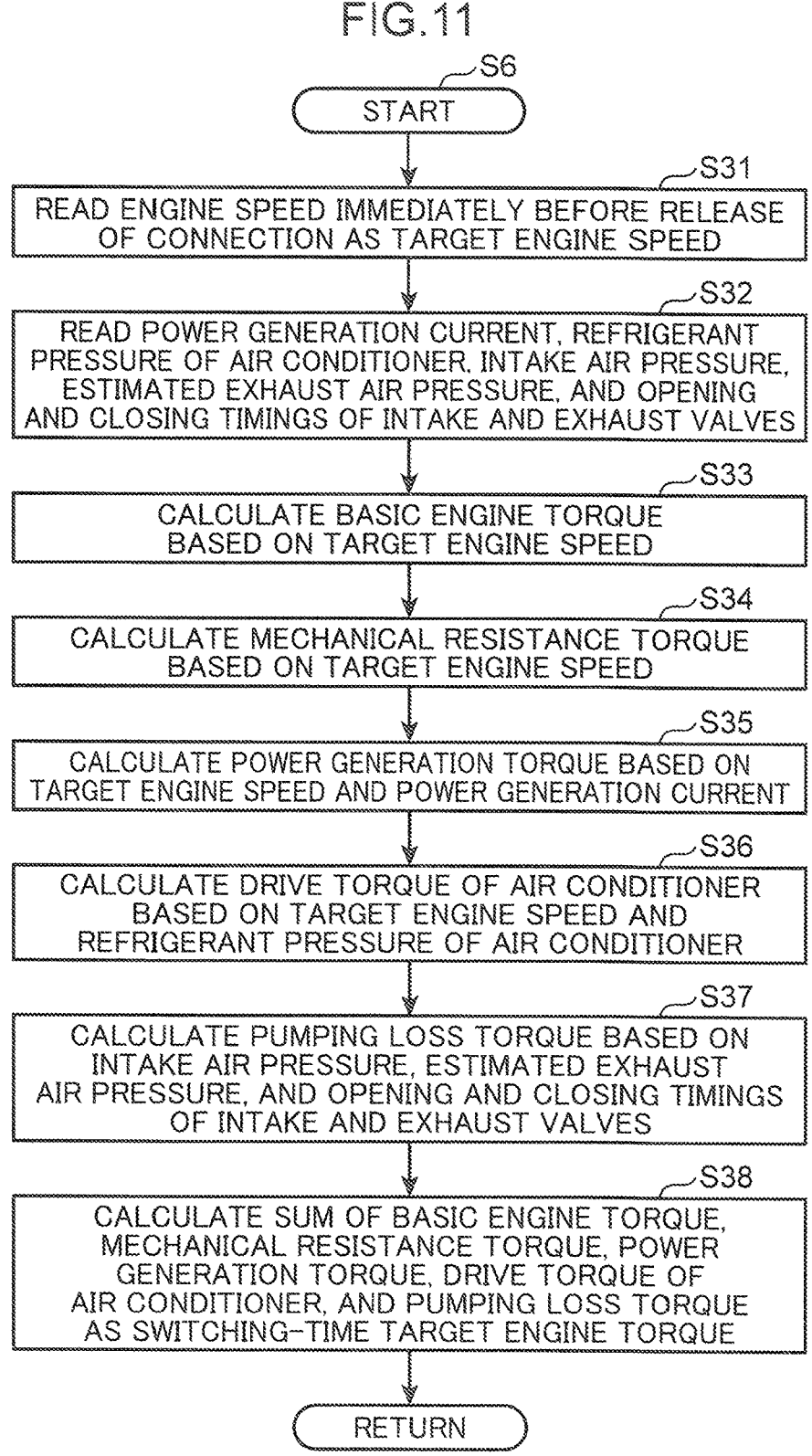
FIG. 11 is a flowchart illustrating a calculation procedure of a target engine torque at the time of switching.

A procedure for calculating a switching-time target engine torque is described using FIG. 11.

First of all, in Step S31, the engine speed control unit 55 reads an engine speed immediately before release of connection between the engine and the transmission, as a target engine speed. After Step S31, the procedure proceeds to Step S32.

In Step S32, the engine speed control unit 55 reads a power generation current, a refrigerant pressure of an air conditioner, an intake air pressure, an estimated exhaust air pressure, and opening and closing timings of the intake valves 8 and the exhaust valves 9 (opening and closing timings of intake valves and exhaust valves). The power generation current is a power generation current of a power generator, which generates electric power when the power generator is connected to the crankshaft 15 and the crankshaft 15 is rotated. The power generation current is detected by e.g. a current sensor. The refrigerant pressure of an air conditioner is a pressure of refrigerant, which flows through an air conditioner provided in the vehicle, and is detected by e.g. a sensor. The refrigerant pressure of an air conditioner is read only when the air conditioner is in an ON-state (only when the air conditioner is operated). The intake air pressure is a value detected by the intake air pressure sensor SN3. The estimated exhaust air pressure is an estimated value of pressure within the exhaust passage 35. The estimated exhaust air pressure is estimated from e.g. an engine speed and an air intake amount. After Step S32, the procedure proceeds to Step S33.

In Step S33, the engine speed control unit 55 calculates a basic engine torque, based on the target engine speed read in Step S31. The basic engine torque is an engine torque at which the engine speed reaches a target engine speed in a state that no external load is exerted to the engine body 1 (a state that connection between the engine and the transmission is released, and that the engine body 1 is not connected to a pump, a power generator, and the like). After Step S33, the procedure proceeds to Step S34.

In Step S34, the engine speed control unit 55 calculates a resistance torque, based on the target engine speed determined in Step S31. The mechanical resistance torque is a torque to be applied to the engine body 1 as a mechanical resistance when the engine body 1 is connected to a pump or the like. After Step S34, the procedure proceeds to Step S35.

In Step S35, the engine speed control unit 55 calculates a power generation torque, based on the target engine speed read in Step S31, and the power generation current read in Step S32. The power generation torque is a value of resistance generated in the engine body 1 accompanied by generation of power by a power generator in terms of torque.

In Step S36, the engine speed control unit 55 calculates a drive torque of an air conditioner, based on the target engine speed read in Step S31, and the refrigerant pressure of an air conditioner read in Step S32. The drive torque of an air conditioner is a mechanical resistance generated in the engine body 1 accompanied by driving of the air conditioner. After Step S36, the procedure proceeds to Step S37. When the air conditioner is in an OFF-state (a state that driving of the air conditioner is stopped), Step S36 is omitted, and the procedure proceeds to Step S37 after Step S35.

In Step S37, the engine speed control unit 55 calculates a pumping loss torque i.e. a pumping loss, based on the intake air pressure, the estimated exhaust air pressure, and the opening and closing timings of the intake valves 8 and the exhaust valves 9, which are read in Step S32. After Step S37, the procedure proceeds to Step S38.

In Step S38, the engine speed control unit 55 sums the basic engine torque, the mechanical resistance torque, the power generation torque, the drive torque of an air conditioner, and the pumping loss torque, which are calculated in Step S33 to Step S37; and sets the sum as a switching-time target engine torque. In this way, the switching-time target engine torque is set to be a torque at which the engine speed reaches an engine speed immediately before release of connection between the engine and the transmission in a state that connection between the engine and the transmission is released.

Setting a switching-time target engine torque as described above makes it possible to control the opening angle of the throttle valve 34, the valve closing timings of the intake valves 8, the fuel injection amounts, the ignition timings i.e. the combustion start timings in such a manner that the engine speed reaches an engine speed immediately before release of connection when the aforementioned switching is not completed after issuance of a switching request, and when connection between the engine and the transmission is released.

(5) Effects

As described above, in an engine to which the engine control device of the embodiment is applied, when a specific condition that switching the operation states of the intake valves 8 and the exhaust valves 9 of the deactivated cylinders (first and fourth cylinders) 2A and 2D by the valve stop mechanisms 25a is not completed, and that connection between the engine and the transmission is released is satisfied after issuance of a switching request from one of a reduced-cylinder operation and an all-cylinder operation to the other thereof, the engine speed is kept to a value immediately before release of the connection between the engine and the transmission, in other words, to a value immediately before the aforementioned specific condition is satisfied. This makes it possible to securely open or close the intended valves first out of the intake valves 8 and the exhaust valves 9 of the deactivated cylinders (first and fourth cylinders) 2A and 2D, while implementing release of connection between the engine and the transmission.

(6) Modifications

In the embodiment, there is described a case, in which the engine speed is kept constant before and after the specific condition is satisfied. Alternatively, the rate of change in the engine speed (the amount of change in the engine speed per unit time) may be set small, as compared with a case in which the specific condition is not satisfied, as far as the aforementioned specific condition is satisfied. Specifically, the engine speed may be moderately changed, as compared with a case, in which the engine is normally operated, by setting a rate of change in the engine speed smaller than the rate of change in the engine speed, which occurs when a target engine torque is set to be a normal target engine torque in the case where connection between the engine and the transmission is released in the same operating condition (in terms of an accelerator pedal position, a gear position, and a vehicle speed). Also, in this configuration, it is possible to avoid a drawback that the intended valves are not opened or closed first out of the intake valves 8 and the exhaust valves 9 of the deactivated cylinders 2A and 2D. Keeping the engine speed constant as described above, however, is advantageous in securely avoiding the aforementioned drawback.

Further, in the embodiment, there is described a case, in which the engine speed control unit 55 keeps the engine speed to an engine speed immediately before release of connection between the engine and the transmission by changing the opening angle of the throttle valve 34, the valve closing timings of the intake valves 8, the fuel injection amounts, and the ignition timings. A specific procedure for keeping the engine speed constant is not limited to the above. For instance, a drive load of an auxiliary machine to be driven by the engine such as a pump may be changed from a drive load immediately before release of connection as described above so as to keep the engine speed constant.

Specifically, when the engine speed drastically decreases as a result of switching the transmission range to the neutral range, and when the engine speed drastically decreases as a result of clutch disengagement, the drive load of an auxiliary machine such as a pump may be increased. For instance, the discharge pressure of a pump may be increased. On the other hand, when the engine speed drastically increases as a result of clutch disengagement, the drive load of an auxiliary machine such as a pump may be lowered. For instance, the discharge pressure of a pump may be lowered.

Further, when the engine speed drastically decreases as a result of release of connection between the engine and the transmission, the ignition timing of the ignition plug 13 may be advanced for keeping the engine speed constant, or for making a rate of change in the engine speed small. Furthermore, when the engine speed drastically increases as a result of release of connection between the engine and the transmission, the ignition timing of the ignition plug 13 may be retarded for keeping the engine speed constant, or for making a rate of change in the engine speed small.

Further, the engine speed drastically decreases as a result of release of connection between the engine and the transmission, the fuel injection amount may be increased for keeping the engine speed constant, or for making a rate of change in the engine speed small. Further, when the engine speed drastically increases as a result of release of connection between the engine and the transmission, the fuel injection amount may be decreased for keeping the engine speed constant, or for making a rate of change in the engine speed small.

Further, the engine speed may be controlled by changing at least one of the drive load of an auxiliary machine, the ignition timing, and the fuel injection amount, or by combining and changing two or more of the parameters.

Further, in the foregoing description, there is described a case, in which in view of a drawback that it may be impossible to open or close the intended valves first accompanied by a drastic change in the engine speed due to the fact that the valve stop mechanism 25a is of hydraulically driven type and due to a delay in a hydraulic operation, the engine speed is controlled to be kept constant in order to solve the drawback. Further, also when the valve control unit 52 starts switching the operation states of the intake valves 8 and the exhaust valves 9 by the valve stop mechanisms 25a upon lapse of a predetermined time period (not using a crank angle but using a time) after issuance of a switching request from one of a reduced-cylinder operation and an all-cylinder operation to the other thereof, it may be impossible to start opening or closing the intended valves first accompanied by a drastic change in the engine speed during the switching time period. In view of the above, the engine speed control unit 55 may control to keep the engine speed constant or to make a rate of change in the engine speed small for the engine having the aforementioned configuration. For instance, the aforementioned control may be executed for an engine configured such that determination is performed whether or not there is a switching request from one of a reduced-cylinder operation to an all-cylinder operation to the other thereof at a specific timing, a timer is turned on by determination of the presence of a switching request, and the valve control unit 52 causes the valve stop mechanisms 25a to start switching when a time measured by the timer has come, in other words, when a predetermined time period lapses after issuance of a switching request (a time period individually set depending on a valve to be opened or closed first).

Further, in the embodiment, there is described a case, in which valve stop mechanisms 25a concurrently switches the states of the intake valves 8 or the exhaust valves 9 of one cylinder. Alternatively, valve stop mechanisms 25a may individually switch the state of each of the intake valves 8 or each of the exhaust valves 9 of one cylinder.

As described above, the present invention is directed to an engine control device to be provided in a vehicle, the vehicle being provided with an engine and a power transmission unit, the engine including a plurality of cylinders, each of which is provided with an intake valve and an exhaust valve, the cylinders being configured to perform combustion of a fuel-air mixture, the engine being operative to switch between an all-cylinder operation in which combustion of the fuel-air mixture is performed in all the cylinders, and a reduced-cylinder operation in which combustion in at least one of the cylinders is stopped and the at least one cylinder is deactivated, the power transmission unit being connected to the engine and configured to transmit power of the engine to wheels. The engine control device includes an operation request determination unit which determines whether the reduced-cylinder operation or the all-cylinder operation is performed based on an operating condition of the engine; a valve stop mechanism which is operative to switch the intake valve and the exhaust valve of the at least one cylinder between an openable/closable state and a closed state; a valve control unit which controls the valve stop mechanism in such a manner that the intake valve and the exhaust valve of the at least one cylinder are set to the openable/closable state when the engine is in the all-cylinder operation, and that the intake valve and the exhaust valve of the at least one cylinder are set to the closed state when the engine is in the reduced-cylinder operation; and an engine speed control unit which controls an engine speed. The valve stop mechanism starts switching the states of the intake valve and the exhaust valve of the at least one cylinder when the operation request determination unit determines a presence of a switching request from one of the reduced-cylinder operation and the all-cylinder operation to the other thereof. The engine speed control unit controls the engine speed in such a manner that an amount of change in the engine speed with respect to time is reduced, as compared with a case in which a specific condition is not satisfied, when the specific condition that the switching by the valve stop mechanism is not completed, and that connection between the engine and the power transmission unit is released is satisfied after the operation request determination unit determines the presence of the switching request.

According to the present invention, it is possible to start opening or closing an intended valve first at the time of issuance of a switching request from one of a reduced-cylinder operation and an all-cylinder operation to the other thereof, while implementing release of connection between the engine and the power transmission unit.

Specifically, in the present invention, when a specific condition that switching the opening and closing states of an intake valve and an exhaust valve of at least one of the cylinders by the valve stop mechanism is not completed, and that connection between the engine and the power transmission unit is released is satisfied at the time of issuance of a switching request from one of a reduced-cylinder operation and an all-cylinder operation to the other thereof, the rate of change in the engine speed is reduced. Therefore, even when connection between the engine and the power transmission unit is released as a result of clutch disengagement or as a result of switching to a neutral range, it is possible to suppress a change in the engine speed during a time period until switching the opening and closing states of the intake valve and the exhaust valve of the at least one cylinder is completed. This is advantageous in securely avoiding difficulty in opening or closing an intended valve first due to a change in the engine speed accompanied by release of connection between the engine and the power transmission unit, while releasing the connection between the engine and the power transmission unit.

Further, when the valve stop mechanism is of hydraulically driven type, it may be impossible to open or close an intended valve first when the engine speed drastically changes due to a delay in a hydraulic operation. In view of the above, applying the present invention to a valve stop mechanism of hydraulically driven type is more advantageous.

Further, even when switching by the valve stop mechanism is started upon lapse of a predetermined time period after issuance of a switching request from one of a reduced-cylinder operation and an all-cylinder operation to the other thereof, it may be impossible to open or close an intended valve first due to a drastic change in the engine speed during the time period. In view of the above, it is more advantageous when the present invention is applied to the aforementioned configuration, specifically, a configuration, in which the valve control unit causes the valve stop mechanism to start the switching upon lapse of a predetermined time period after the operation request determination unit determines the presence of a switching request from one of a reduced-cylinder operation and an all-cylinder operation to the other thereof.

Further, changing a drive load of an auxiliary machine to be driven by the engine, a combustion start timing in each of the cylinders, and an amount of fuel to be supplied to each of the cylinders are examples of specific control to be performed when the engine speed control unit controls the engine speed. The engine speed control unit may preferably be configured to change at least one of the parameters.

Further, in the present invention, the engine speed control unit may preferably keep the engine speed constant before and after the specific condition is satisfied.

According to the aforementioned configuration, it is possible to securely start opening or closing an intended valve first at the time of issuance of a switching request from one of a reduced-cylinder operation and an all-cylinder operation to the other thereof.

REFERENCE SIGNS LIST 2A to 2D Cylinders
8 Intake valve
9 Exhaust valve
25a Valve stop mechanism
50 ECU
52 Valve control unit
55 Engine speed control unit

The invention claimed is:

1. An engine control device to be provided in a vehicle, the vehicle being provided with an engine and a power transmission unit, the engine including a plurality of cylinders, each of which is provided with an intake valve and an exhaust valve, the cylinders being configured to perform combustion of a fuel-air mixture, the engine being operative to switch between an all-cylinder operation in which combustion of the fuel-air mixture is performed in all the cylinders, and a reduced-cylinder operation in which combustion in at least one of the cylinders is stopped and the at least one cylinder is deactivated, the power transmission unit being connected to the engine and configured to transmit power of the engine to wheels, the engine control device comprising:

an operation request determination unit which determines whether the reduced-cylinder operation or the all-cylinder operation is performed based on an operating condition of the engine;
a valve stop mechanism which is operative to switch the intake valve and the exhaust valve of the at least one cylinder between an openable/closable state and a closed state;
a valve control unit which controls the valve stop mechanism in such a manner that the intake valve and the exhaust valve of the at least one cylinder are set to the openable/closable state when the engine is in the all-cylinder operation, and that the intake valve and the exhaust valve of the at least one cylinder are set to the closed state when the engine is in the reduced-cylinder operation; and
an engine speed control unit which controls an engine speed, wherein
the valve stop mechanism starts switching the states of the intake valve and the exhaust valve of the at least one cylinder when the operation request determination unit determines a presence of a switching request from one of the reduced-cylinder operation and the all-cylinder operation to the other thereof, and the engine speed control unit controls the engine speed in such a manner that an amount of change in the engine speed with respect to time is reduced, as compared with a case in which connection between the engine and the power transmission unit is not released during a time period until the switching by the valve stop mechanism is completed after determination of the presence of the switching request, when the connection is released during a time period until the switching by the valve stop mechanism is completed after the operation request determination unit determines the presence of the switching request.

2. The engine control device according to claim 1, wherein
the valve stop mechanism is of hydraulically driven type, and is operative to complete the switching upon lapse of a predetermined operation delay time period after switching the states of the intake valve and the exhaust valve of the at least one cylinder is started.

3. The engine control device according to claim 2, wherein
the valve control unit causes the valve stop mechanism to start the switching upon lapse of a predetermined time period after the operation request determination unit determines the presence of the switching request from one of the reduced-cylinder operation and the all-cylinder operation to the other thereof.

4. The engine control device according to claim 3, wherein
the engine speed control unit controls the engine speed by changing at least one of a drive load of an auxiliary machine to be driven by the engine, a combustion start timing in a cylinder in which combustion is performed, and an amount of fuel to be supplied to a cylinder in which combustion is performed.

5. The engine control device according to claim 4, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

6. The engine control device according to claim 3, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

7. The engine control device according to claim 2, wherein
the engine speed control unit controls the engine speed by changing at least one of a drive load of an auxiliary machine to be driven by the engine, a combustion start timing in a cylinder in which combustion is performed, and an amount of fuel to be supplied to a cylinder in which combustion is performed.

8. The engine control device according to claim 7, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

9. The engine control device according to claim 2, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

10. The engine control device according to claim 1, wherein
the valve control unit causes the valve stop mechanism to start the switching upon lapse of a predetermined time period after the operation request determination unit determines the presence of the switching request from one of the reduced-cylinder operation and the all-cylinder operation to the other thereof.

11. The engine control device according to claim 10, wherein
the engine speed control unit controls the engine speed by changing at least one of a drive load of an auxiliary machine to be driven by the engine, a combustion start timing in a cylinder in which combustion is performed, and an amount of fuel to be supplied to a cylinder in which combustion is performed.

12. The engine control device according to claim 11, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

13. The engine control device according to claim 10, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

14. The engine control device according to claim 1, wherein
the engine speed control unit controls the engine speed by changing at least one of a drive load of an auxiliary machine to be driven by the engine, a combustion start timing in a cylinder in which combustion is performed, and an amount of fuel to be supplied to a cylinder in which combustion is performed.

15. The engine control device according to claim 14, wherein
the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and
the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

16. The engine control device according to claim 1, wherein the engine speed control unit sets a target engine torque being a target value of engine torque depending on an acceleration operation, and controls an amount of intake air to be drawn into the cylinder and an amount of fuel to be supplied to the cylinder so as to obtain the target engine torque, and the engine speed control unit calculates an engine torque for obtaining the engine speed before connection between the engine and the power transmission unit is released, and sets the calculated engine torque as the target engine torque so as to control the amount of intake air and the amount of fuel so as to keep the engine speed constant before and after the connection is released when the connection is released during a time period until the switching by the valve stop mechanism is completed after determination of the presence of the switching request.

* * * * *